United States Patent
Noldus et al.

(10) Patent No.: US 9,794,302 B2
(45) Date of Patent: Oct. 17, 2017

(54) METHOD, NETWORK AND NETWORK ENTITY FOR ESTABLISHING A COMMUNICATION SESSION TO A USER EQUIPMENT ROAMING IN IMS

(75) Inventors: Rogier August Caspar Joseph Noldus, Goirle (NL); Martien Huijsmans, Oisterwijk (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 148 days.

(21) Appl. No.: 14/402,045

(22) PCT Filed: May 24, 2012

(86) PCT No.: PCT/EP2012/059780
§ 371 (c)(1),
(2), (4) Date: Nov. 20, 2014

(87) PCT Pub. No.: WO2013/174440
PCT Pub. Date: Nov. 28, 2013

(65) Prior Publication Data
US 2015/0131526 A1    May 14, 2015

(51) Int. Cl.
*H04L 29/06* (2006.01)
*H04W 76/02* (2009.01)
(Continued)

(52) U.S. Cl.
CPC ........ *H04L 65/1069* (2013.01); *H04L 65/103* (2013.01); *H04L 65/105* (2013.01);
(Continued)

(58) Field of Classification Search
CPC ..... H04W 8/06; H04L 65/1069; H04L 65/105
(Continued)

(56) References Cited

U.S. PATENT DOCUMENTS

2005/0058125 A1    3/2005  Mutikainen et al.
2010/0309879 A1*   12/2010 Ala-Luukko ......... H04W 76/02
                                                    370/331
(Continued)

FOREIGN PATENT DOCUMENTS

CN    101690084 A    3/2010
CN    101855890 A    10/2010
(Continued)

OTHER PUBLICATIONS

Unknown, Author, "DNS/ENUM Guidelines for Service Providers & GRX/IPX Providers", GSMA PRD IR.67, V4.1, Mar. 3, 2010, 1-76.
(Continued)

*Primary Examiner* — Jae Y Lee
*Assistant Examiner* — Jean F Voltaire
(74) *Attorney, Agent, or Firm* — Murphy, Bilak & Homiller, PLLC

(57) ABSTRACT

The invention relates to a method, network ad network entity for establishing a communication session between a calling subscriber residing in a first Visited IMS network and a called subscriber roaming in a second Visited IMS network. The method includes routing a first Invite request for the communication session via a media path extending from the first Visited IMS network via a Home IMS network of the called subscriber to the second Visited IMS network, and establishing the communication session. The method further includes inserting an additional IMS network entity, residing in the second Visited IMS network, in the part of the media path extending from the first Visited IMS network to the Home IMS network of the called subscriber and removing the Home IMS network of the called subscriber from the media path.

14 Claims, 16 Drawing Sheets

(51) Int. Cl.
  *H04W 8/02*   (2009.01)
  *H04W 8/06*   (2009.01)
  *H04W 80/10*  (2009.01)
  *H04W 8/08*   (2009.01)
  *H04L 29/08*  (2006.01)

(52) U.S. Cl.
  CPC ...... *H04L 65/1016* (2013.01); *H04L 65/1023* (2013.01); *H04W 8/02* (2013.01); *H04W 8/06* (2013.01); *H04W 76/02* (2013.01); *H04L 65/1006* (2013.01); *H04L 65/80* (2013.01); *H04L 67/141* (2013.01); *H04W 8/082* (2013.01); *H04W 80/10* (2013.01)

(58) Field of Classification Search
  USPC .................................................. 370/328–331
  See application file for complete search history.

(56) References Cited

U.S. PATENT DOCUMENTS

2012/0302196 A1* 11/2012 Chin ................... H04L 65/1073
                                                                 455/404.1
2012/0307813 A1* 12/2012 Alriksson ........... H04L 65/1016
                                                                 370/338

FOREIGN PATENT DOCUMENTS

| | | |
|---|---|---|
| CN | 102158496 A | 8/2011 |
| EP | 1841275 A2 | 10/2007 |
| WO | 0203582 A2 | 1/2002 |
| WO | 2009090307 A1 | 7/2009 |
| WO | WO2009090307 * | 7/2009 |

OTHER PUBLICATIONS

Unknown, Author, "IMS Roaming and Interworking Guidelines", GSMA PRD IR.65, V12.0, Feb. 15, 2013, 1-38.

3GPP, "3rd Generation Partnership Project; Technical Specification Group Services and System Aspects; IP Multimedia Subsystem (IMS); Stage 2 (Release 11)", 3GPP TS 23.228 V11.3.0, Dec. 2011, 1-278.

3GPP, "3rd Generation Partnership Project; Technical Specification Group Services and System Aspects; Study on roaming architecture for voice over IP Multimedia Subsystem (IMS) with local breakout (Release 11)", 3GPP TR 23.850 V11.0.0, Dec. 2011, 1-40.

* cited by examiner

METHOD, NETWORK AND NETWORK ENTITY FOR ESTABLISHING A COMMUNICATION SESSION TO A USER EQUIPMENT ROAMING IN IMS

TECHNICAL FIELD

The invention relates to Internet Protocol multimedia networks. The invention also relates to network entities for use in such networks. More specifically, the invention relates to Voice over Long Term Evolution, VoLTE, based communications networks, networks equipped to enable interactive sessions of Voice, Video and data Messages.

BACKGROUND

The 3$^{rd}$ Generation Partnership Project, 3GPP, Release 11 has introduced a mechanism for optimizing media transfer for a Session Initiation Protocol, SIP, session originated by a roaming Internet Protocol, IP, Multimedia Subsystem, IMS, user. This method has been analysed in the RAVEL work item within 3GPP (3GPP TR 23.850; Study on roaming architecture for voice over IP Multimedia Subsystem (IMS) with local breakout ('RAVEL')). The result of this study is included in 3GPP TS 23.228 v11.3.0. FIG. 1 of the present document shows a conceptual architecture for Optimized media routing for an originating voice over Long Term Evolution, VoLTE, session by a roaming subscriber.

The media optimization according to 3GPP Release 11 applies to the media routing between the Visited IMS network of A-party (i.e. calling subscriber) and the Home IMS network of the B-party (i.e. called subscriber). When the B-party is roaming outside its Home IMS network, then the user plane for the call will be routed from the Visited IMS network of the A-party via the Home IMS network of the B-party to the Visited IMS network of the B-party.

This media transfer is not fully optimized. For example, when the A-party and the B-party are both roaming in the same country, the media will be routed from the Visited IMS network of the A-party via the Home IMS network of the B-party to the Visited IMS network of the B-party, and vice versa. The media is routed from the visited country to the home country of the B-party and back to the visited country. This is a situation which seemingly uses more media routing resources than necessary and adds costs to roaming for VoLTE subscribers.

SUMMARY

It is an object of the invention to obviate at least some of the above disadvantages and to provide an improved method for establishing a communication session for roaming subscribers. It is also an object to provide a network entity for an IP multimedia network providing more versatility. The market is striving for reducing the cost of communication when roaming. This endeavour is especially important within the context of the telecommunication industry's goal to let VoLTE evolve towards the preferred method of mobile person-to-person communication. When the called subscriber, or both the called and calling subscriber are roaming, especially when the calling subscriber and the called subscriber residine in the same visited country, and a communication session is established, the cost of that session may be constrained by routing the user plane of that call through local media transmission infrastructure. Current 3GPP network architecture does not allow for this, however.

Thereto, according to the invention is provided a method for establishing a communication session between a calling subscriber user equipment residing in, i.e. being registered to, a first Visited Internet Protocol Multimedia Subsystem, IMS, network and a called subscriber user equipment roaming in a second Visited IMS network. The method includes routing a first Invite request for the communication session via a media path extending from the first Visited IMS network associated with the calling subscriber via a Home IMS network of the called subscriber to the second Visited IMS network associated with the called subscriber. Upon receiving the first Invite request the called subscriber user equipment establishes the communication session. Next, an additional IMS network entity, residing in the second Visited IMS network associated with the called subscriber, is inserted in the part of the media path of the communication session extending from the first Visited IMS network associated with the calling subscriber to the Home IMS network of the called subscriber. Subsequently, the Home IMS network of the called subscriber is removed from the media path of the communication session.

This has the advantage that in this communication session media is routed from the Visited IMS network of the calling subscriber via the additional IMS network entity in the Visited IMS network of the called subscriber to the called subscriber user equipment without traversing the Home IMS network of the called subscriber. Upon inserting the additional IMS network entity a signalling path is established from the additional IMS network entity via the Home IMS network of the called subscriber to the called subscriber user equipment.

The term Visited IMS Network herein denotes the IMS network where the subscriber is currently registered. The term Home IMS network herein denotes the IMS network of which the calling subscriber or called subscriber, respectively, is a subscriber. It will be appreciated that the calling subscriber user equipment may be roaming in the first Visited IMS network, the first visited IMS network not being the calling subscriber's Home IMS network. It is also possible that the calling subscriber user equipment resides in its Home IMS network, which then will be identified as the first Visited IMS network. The invention relates to a situation wherein the called subscriber user equipment is roaming, i.e. resides in a Visited IMS network which is not the Home IMS network of the called subscriber. It will be appreciated that when the calling subscriber and the called subscriber are registered to the same IMS network, e.g. both roaming in the same country, the first Visited IMS network and the second Visited IMS network are the same IMS network.

It will be appreciated that the calling subscriber user equipment can be a human operated device, such as a subscriber's terminal, or a non-human operated device. Alternatively, or additionally, the called subscriber user equipment can be a human operated device, such as a subscriber's terminal, or a non-human operated device.

The communications network can be a Voice over Long Term Evolution, VoLTE, based communications network. VoLTE uses Multimedia Telephony, MMTel, which is the basic telephony within IMS, over Long Term Evolution, LTE, access networks. VoLTE networks are equipped to enable interactive sessions of Voice, Video and data Messages. The term "VoLTE" was originally applied to indicate Voice sessions over LTE, but evolved to networks capable to enable Video and data sessions. In this document the term "VoLTE" is understood to be a network enabling Voice, Video and Data sessions.

It will be appreciated that the calling subscriber user equipment and/or the called subscriber user equipment can, in particular use cases, use non-LTE access, such as Wideband Code Division Multiple Access, W-CDMA, or High Speed Packet Access, HSPA.

Optionally, the first Invite request includes an indication that inserting of the additional IMS network entity is supported by the calling subscriber and/or supported by the first Visited IMS network. This provides the advantage that other network entities, such as e.g. a server, in the second Visited IMS network are aware of the calling subscriber and/or first Visited IMS network supporting such.

The step of inserting the additional IMS network entity includes providing to an IMS proxy, such as an interconnect border control function, IBCF, of the second Visited IMS network, by the Home IMS network of the called subscriber or by the called subscriber, an indication, such as a designated option tag in the Require header, that the additional IMS network entity is to be inserted in the media path and control path. Such indication can be provided by the P-CSCF of the called subscriber. Herein the indication comprises a domain name of the additional IMS network entity of the second Visited IMS network. This step further includes transmitting, by the IMS proxy of the first Visited IMS network, a second Invite request to, e.g. an IMS proxy (such as a first Interconnect Border Control Function, IBCF) included by, the additional IMS network entity. This step also includes forwarding by the additional IMS network entity the second Invite request to, e.g. an IMS proxy of, the Home IMS network of the called party, whereby the second Invite request is forwarded through the additional IMS network entity.

The additional IMS network entity (e.g. the first IBCF thereof) anchors the media path, e.g. in a Transition Gateway, TrGW, associated therewith. This provides the advantage that media path anchoring can be shifted from the Home IMS network of the called subscriber to the second Visited IMS network associated with the called subscriber.

Prior to removing the Home IMS network of the called subscriber from the media path an instruction (e.g. in a Dialogue-replaces header) to (the IMS proxy of) the Home IMS network of the called party is included in the second Invite request. Said instruction entails that said second Invite request replaces the previous dialogue that was established between the IMS proxy of the first Visited IMS network and the Home IMS network of the called subscriber.

The step of removing the Home IMS network of the called subscriber from the media path includes transmitting by the Proxy call session control function, P-CSCF, of the called subscriber to, e.g. an IMS proxy (such as the first IBCF) included by, the additional IMS network entity an Update request including an indication (such as a designated option tag in the Require header) that each network entity, associated with each hop between the P-CSCF and the additional IMS network entity, is to be removed from the media path.

The first Invite request has a control path for the communication session extending from the first Visited IMS network via the Home IMS network of the called subscriber to the second Visited IMS network, wherein the step of inserting includes inserting an additional IMS network entity, residing in the second Visited IMS network, in the part of the control path of the communication session extending from the first Visited IMS network to the Home IMS network of the called subscriber. Hence, the control path follows the media path from the first Visited IMS network to the second Visited IMS network, although the control path will also traverse the Home IMS network of the called subscriber.

In an embodiment, the additional IMS network entity includes a first IBCF and a second IBCF, wherein after the step of removing the Home IMS network of the called subscriber from the media path the first IBCF has a TrGW associated therewith for handling the user plane communication with the first Visited IMS network, wherein the first IBCF handles the control plane communication with the first Visited IMS network, and wherein the second IBCF handles the control plane communication with the Home IMS network of the called subscriber.

After the communication session has been established according to the invention, the communication session routing path will be as follows. The control plane of the communication session is routed between the first Visited IMS network and the Home IMS network of the calling subscriber, without anchoring the user plane in the Home IMS network of the calling subscriber. The control plane and user plane are routed directly, through Internet Protocol Packet Exchange, IPX, between the first Visited IMS network and the second Visited IMS network without traversing the Home IMS network of the called subscriber. The control plane is routed between the second Visited IMS network and the Home IMS network of the called subscriber, without anchoring the user plane in the Home IMS network of the called subscriber.

The invention also relates to a communications network, such as a VoLTE based communications network, including a calling subscriber user equipment residing in a first Visited Internet Protocol Multimedia Subsystem, IMS, network; and a called subscriber user equipment roaming in a second Visited IMS network and having associated therewith a Home IMS network of the called subscriber. The first Visited IMS network is arranged for routing a first Invite request having a media path for the communication session from the first Visited IMS network via the Home IMS network of the called subscriber to the second Visited IMS network. The called subscriber user equipment is arranged for establishing the communication session. The second Visited IMS network is arranged for inserting an additional IMS network entity in the part of the media path, and optionally control path, of the communication session from the first Visited IMS network to the Home IMS network of the called subscriber. The Home IMS network of the called subscriber is arranged for removing the Home IMS network of the called subscriber from the media path. Hence, media can be routed from the first Visited IMS network via the additional IMS network entity in the second Visited IMS network to the called subscriber user equipment without traversing the Home IMS network of the called subscriber.

BRIEF DESCRIPTION OF THE DRAWINGS

The invention will now be further elucidated by means of non-limiting examples referring to the drawings, in which.

In the figures like reference numerals refer to like entities or processes.

DETAILED DESCRIPTION

Figure 1:
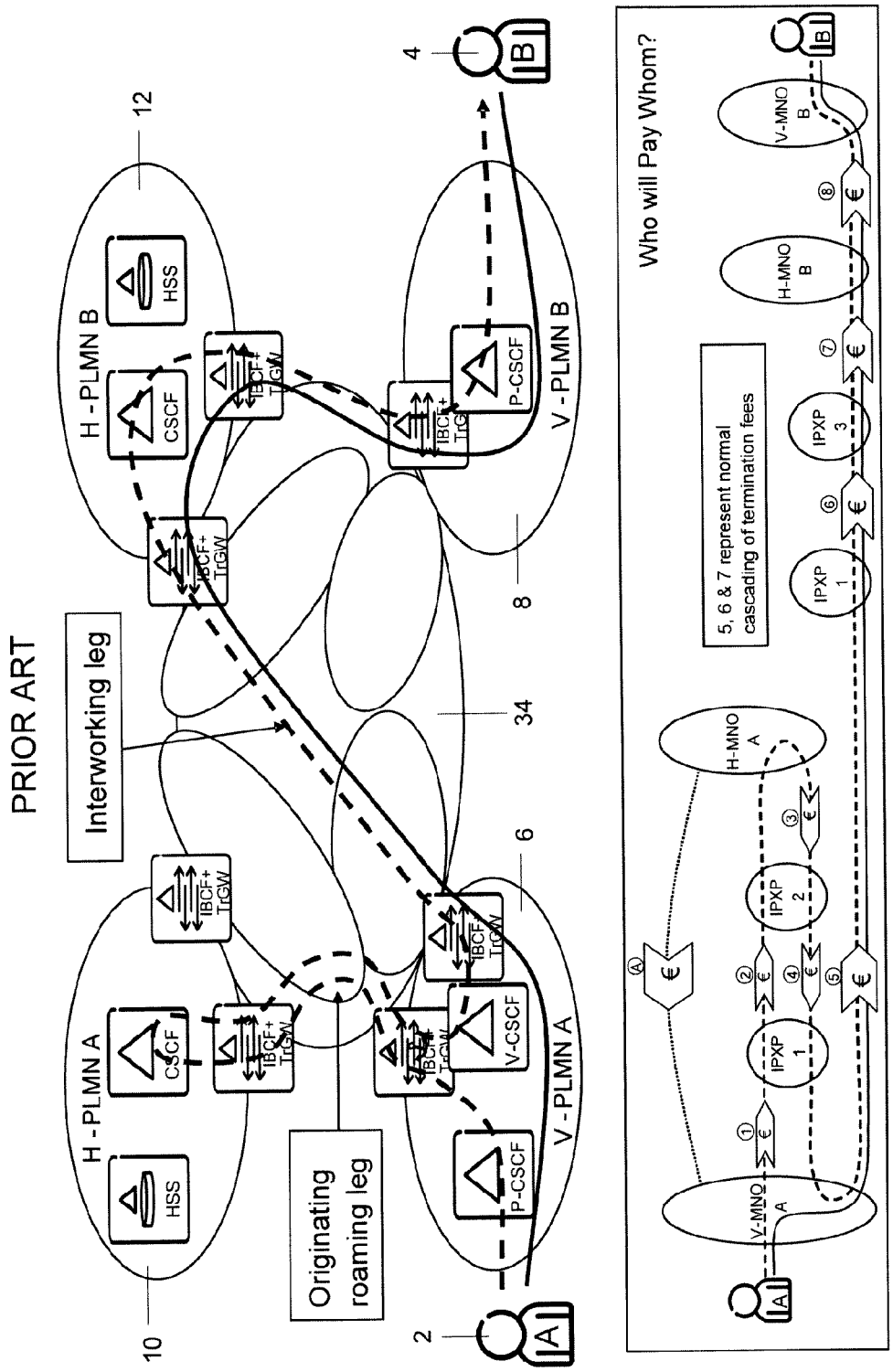
FIG. 1 is a schematic representation of a prior art communications network.

The 3$^{rd}$ Generation Partnership Project, 3GPP, Release 11 has introduced a mechanism for optimizing media transfer for a Session Initiation Protocol, SIP, session originated by a roaming Internet Protocol, IP, Multimedia Subsystem, IMS, user. This method has been analysed in the RAVEL work item within 3GPP (3GPP TR 23.850; Study on roaming architecture for voice over IP Multimedia Subsystem (IMS) with local breakout ('RAVEL')). The result of this study is included in 3GPP TS 23.228 v11.3.0. FIG. 1 shows a conceptual architecture for Optimized media routing for an originating voice over Long Term Evolution, VoLTE, session by a roaming subscriber. VoLTE networks are equipped to enable interactive sessions of Voice, Video and data Messages. The term "VoLTE" was originally applied to indicate Voice sessions over LTE, but evolved to networks capable to enable Video and data sessions. In this document the term "VoLTE" is understood to be a network enabling Voice, Video and Data sessions.

The control plane of the SIP session that is established by the roaming VoLTE subscriber 2 is routed from the Visited IMS network 6 of the A-party to the Home IMS network 10 of the A-party and then back to the Visited IMS network 6 of the A-party. The user plane for this SIP session is not anchored in the Home IMS network 10 of the A-party, i.e. the user plane does not traverse the Home IMS network 10 of the A-party. The control plane and the user plane are then, jointly, routed to the Home IMS network 12 of the B-party. This routing takes place through the IP interconnect network, IPX, 34. IPX is known to the skilled reader and will not be treated here in more detail. Those less familiar with IPX are referred i.a. to GSMA PRD IR.65 IMS Roaming & Interworking Guidelines, and GSMA PRD IR.67 DNS/ENUM Guidelines for Service Providers & GRX/IPX Providers.

In FIG. 1, the user plane for this SIP session, carrying the voice or video media, traverses the IPX 34 while being accompanied by its associated control plane through that same IPX. At the same time, the Home IMS network 10 of the A-party retains control over the SIP session since the control plane is routed through the Home IMS network 10 of the A-party and then routed back to the Visited IMS network 6 of the A-party.

The media optimization according to 3GPP Release 11 applies to the media routing between the Visited IMS network 6 of A-party and the Home IMS network 12 of the B-party. When the B-party is roaming outside its Home IMS network 12, then the user plane for the call will be routed from the Visited IMS network 6 of the A-party via the Home IMS network 12 of the B-party to the Visited IMS network 8 of the B-party.

Figure 2:
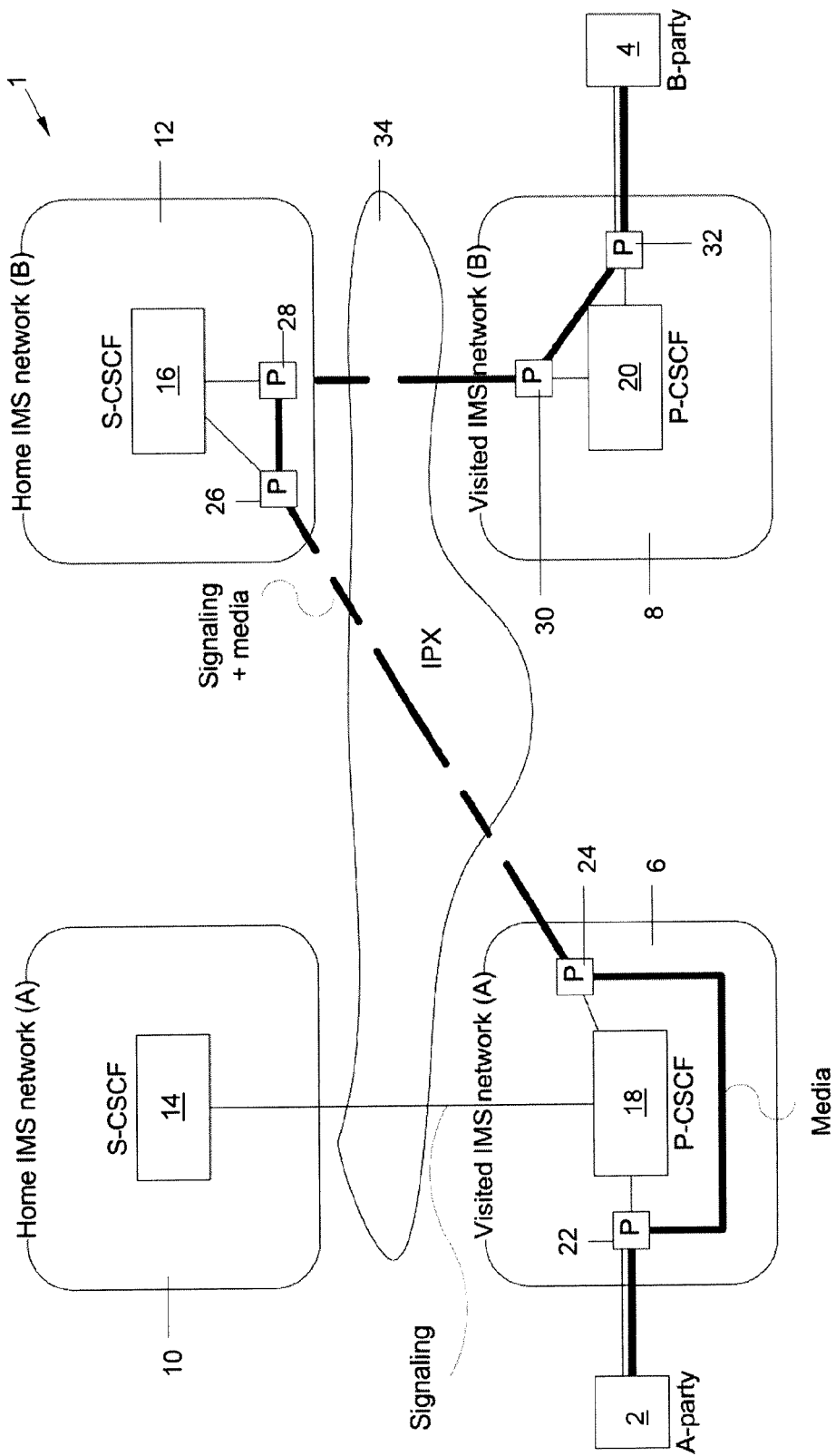
FIG. 2 is a schematic representation of a prior art communications network.

FIG. 2 shows a schematic representation of such SIP session. FIG. 2 is not intended to provide complete network architecture; it shows those entities that are relevant for understanding the concept of optimized media transfer according to 3GPP Release 11. The boxes 22, 24, 26, 28, 30, 32 labelled 'P' represent Session border gateways, comprising a control plane component and a user plane component, e.g. an Interconnect Border Control Function, IBCF, and a Transition Gateway, TrGW. The Multimedia telephony, MMTel, application server, AS, is not explicitly shown, but it's understood that an MMTel AS, as well as a Service Centralisation and Continuity Application Server, SCC-AS, are connected to a Serving Call Session Control Function, S-CSCF. Also, entities like Access Transfer Control Function, ATCF, and Access Transfer Gateway, ATGW, in the Visited IMS network are not shown.

When the SIP session is established, the S-CSCF 14 in the Home IMS network 10 of A-party and the Proxy Call Session Control Function, P-CSCF, 18 in the Visited IMS network 6 of the A-party cooperate, resulting in that the S-CSCF 14 may route the SIP session back to the Visited IMS network 6, without anchoring the media in the Home IMS network 10, i.e. without requiring the media path to traverse the Home IMS network 10. The SIP session establishment then continues, through IPX 34, towards the Home IMS network 12 of the B-party (or to a Circuit Switched, CS, network of the B-party, if the B-party is a CS subscriber).

The IPX 34 is presented in the above description and FIG. 1 and FIG. 2 as a 'cloud' representing an interconnection network through which IMS operators may be connected. In practice, an operator may use one or more IPX based interconnections. Different IPX network(s) may be used towards different partner IMS networks. This differentiation is not further described in this document, but assumed understood by the informed reader.

The media transfer as described with FIG. 1 and FIG. 2 is not fully optimized. For example, when the A-party and the B-party are both roaming in the same country, the media will be routed from the Visited IMS network 6 of the A-party via the Home IMS network 12 of the B-party to the Visited IMS network 8 of the B-party, and vice versa. The media is routed from the visited country to the home country of the B-party and back to the visited country. This is an undesirable situation which seemingly uses more media routing resources than necessary and adds unnecessary costs to roaming for VoLTE subscribers.

Figure 4:
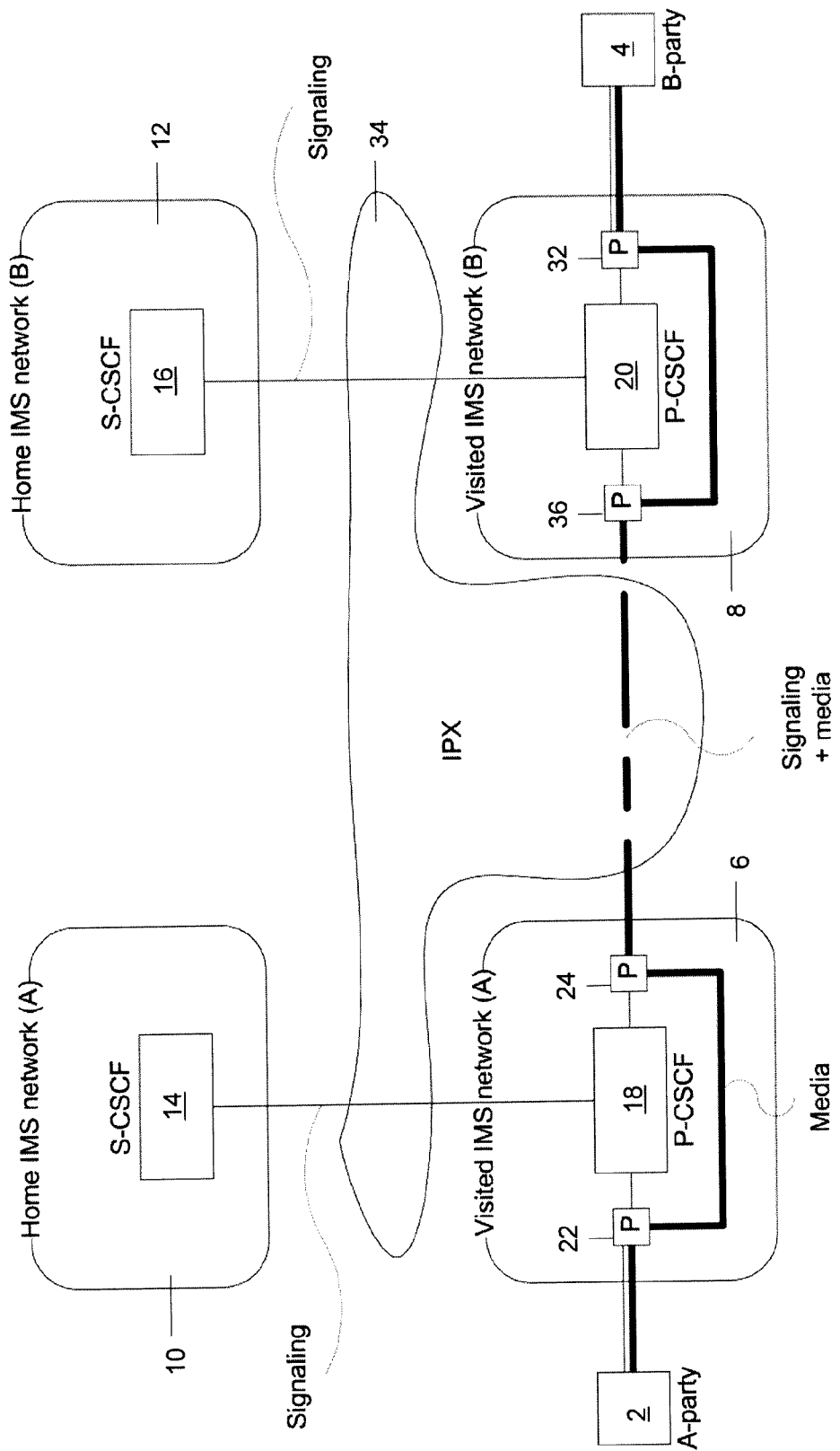
FIG. 4 is a schematic representation of a communications network.

FIG. 4 shows a schematic representation of optimized media transfer for a calling A-party subscriber 2 and a called B-party subscriber 4 in a VoLTE based communications network according to the invention. The communication session that is established between the A-party 2 and the B-party 4 has the following characteristics. The control plane is routed between a Visited IMS network 6 of the A-party 2 and a Home IMS network 10 of the A-party 2. Herein the user plane is does not traverse the Home IMS network 10, i.e. the user plane is not anchored in the A-party Home IMS network 10. The term Visited IMS Network herein denotes the IMS network where the subscriber is currently registered. The term Home IMS network herein denotes the IMS network of which the calling A-party (or called B-party, respectively) is a subscriber. It will be appreciated that when an A-party user equipment is roaming in the Visited IMS network 6, the Visited IMS network 6 is a different IMS network than the A-party Home IMS network 10. It is also possible that the A-party user equipment resides in its Home IMS network in which case the A-party Visited IMS network 6 and the A-party Home IMS network 10 are the same IMS network.

The control plane and the user plane are established, through IPX 34, between the Visited IMS network 6 of the A-party and a Visited IMS network 8 of the B-party. The control plane is routed between the Visited IMS network 8 of the B-party and a Home IMS network 12 of the B-party. Herein the user plane does not traverse the Home IMS network 12, i.e. the user plane is not anchored in the B-party Home IMS network 12.

FIG. 4 and the above description reflect the SIP session in a situation when the call is established. This resulting situation provides the following desired aspects. Media for the call, e.g. voice and/or video, is optimally routed between the A-party 2 and the B party 4. The Home IMS network 10 of the A-party has control over the call. This control resides with an MMTel AS connected to an S-CSCF 14 in the A-party Home IMS network 10, and potentially with a Value added service node connected to the MMTel AS though a northbound interface from the MMTel AS. The Home IMS network 12 of the B-party 4 has control over the call. This control resides with an MMTel AS connected to an S-CSCF 16 in the B-party Home IMS network 12, and potentially with a Value added service node connected to the MMTel AS though a northbound interface from the MMTel AS.

The basic concept of the invention entails that once the communication session between the A-party 2 and the B-party 4 is established, the SIP session is changed to be routed directly between the Visited IMS network 6 of the A-party and the visited network 8 of the B-party and the media will not be anchored in Home IMS network 12 of the B-party. How such communication session is established is described below.

The method according to the present invention is fundamentally different from BOR. When a call has been established between a (roaming) IMS A-party and a roaming IMS B-party, the media plane between the two parties involved in the call will be optimized while leaving the control plane traversing the respective home networks of calling party and called party. Hence, the respective Telephony servers for the A party and B-party retain full control over the call.

The following describes functional architecture. For practical deployment, two or more functional entities may be combined into a single node. Such combination does not constitute a deviation of the principle of the proposed method. Not all details normally required for an end-to-end SIP session are reflected following.

Figure 14:
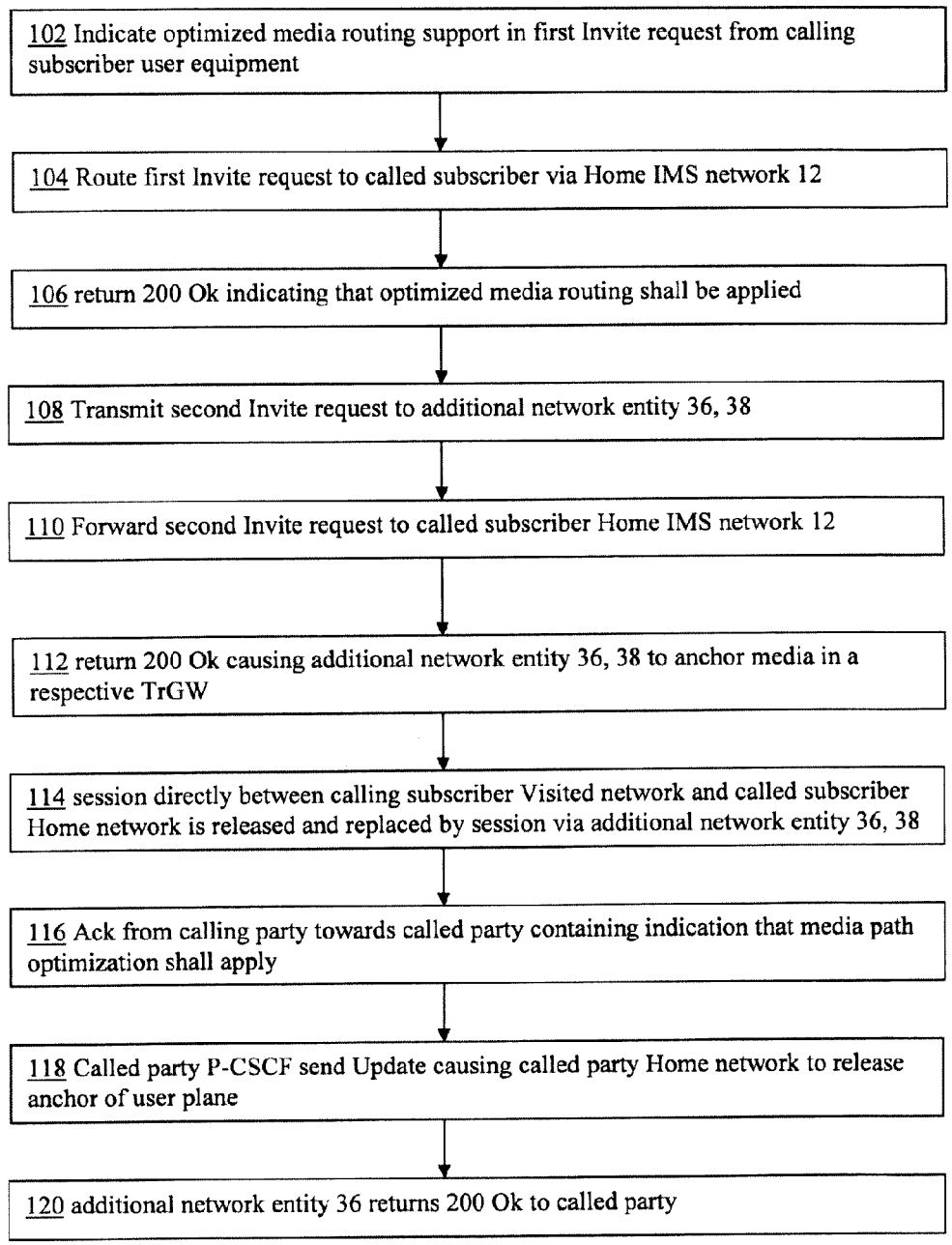
FIG. 14 is a flow chart representing a process.

The A-party routes a first Invite request to the B-party (see step 104 in FIG. 14). The A-party user equipment or a network entity in the Visited IMS network 6 indicates in the (first) Invite request that it supports optimized media routing (see step 102 in FIG. 14). The destination of the communication session, established by the A-party 2, is known when the session reaches the active state, i.e. when an Invite sent from the A-party 2 towards the B-party 4 results in a 200 Ok final response from the one or more terminals of the B-party 4 (see step 106 in FIG. 14). However, when one terminal of the B-party 4 sends a 200 Ok final response, the SIP session is established as shown in FIG. 2 and in FIG. 4. It will be clear that at that point in time, it is no longer possible to apply the following changes to the SIP session: (1) Change the SIP session routing from: "Visited IMS network (A) 6—Home IMS network (B) 12—Visited IMS network (B) 8" to "Visited IMS network (A) 6—Visited IMS network (B) 8"; and (2) Change media anchoring from: "Media anchoring in Home IMS network 12 of B-party" to "No media anchoring in Home IMS network 12 of B-party".

Figure 5A:
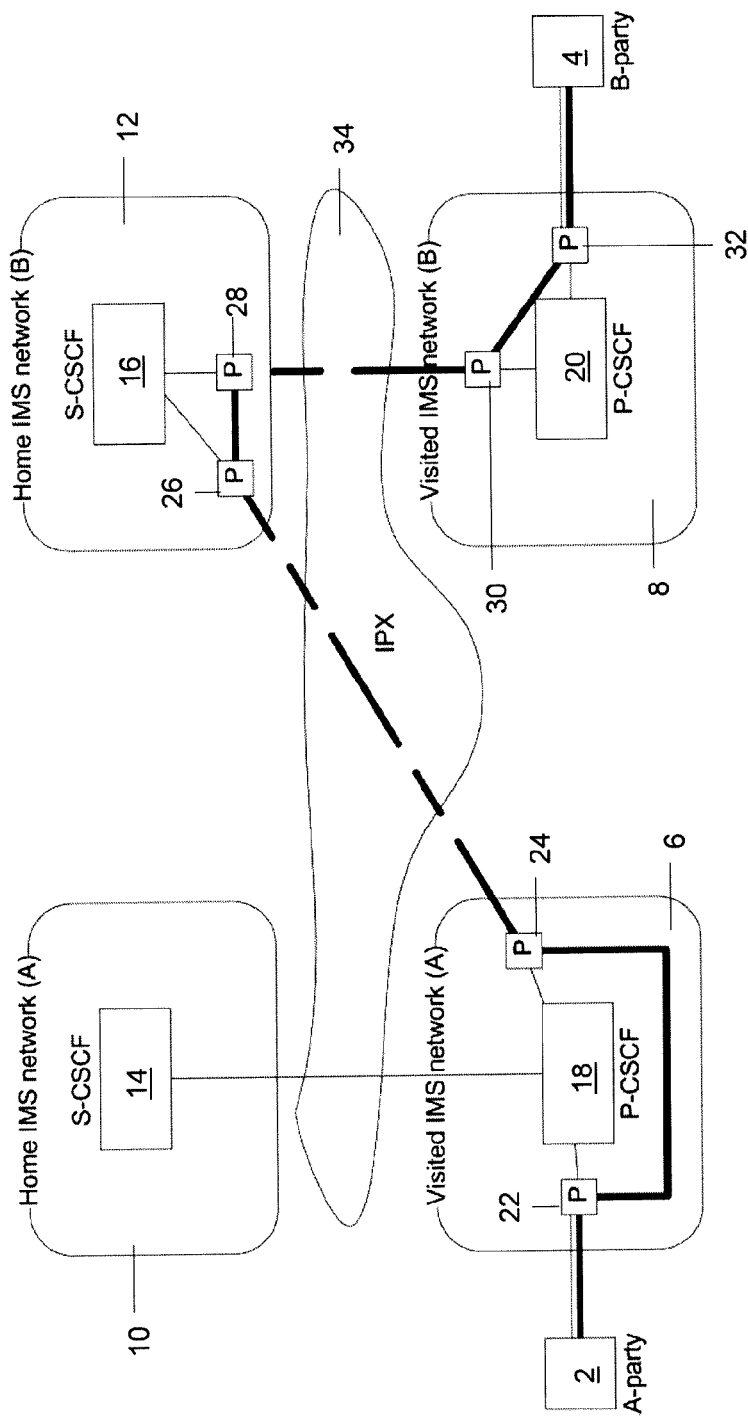
FIG. 5A, 5B and 5C are schematic representations of a communications network.
Figure 5B:
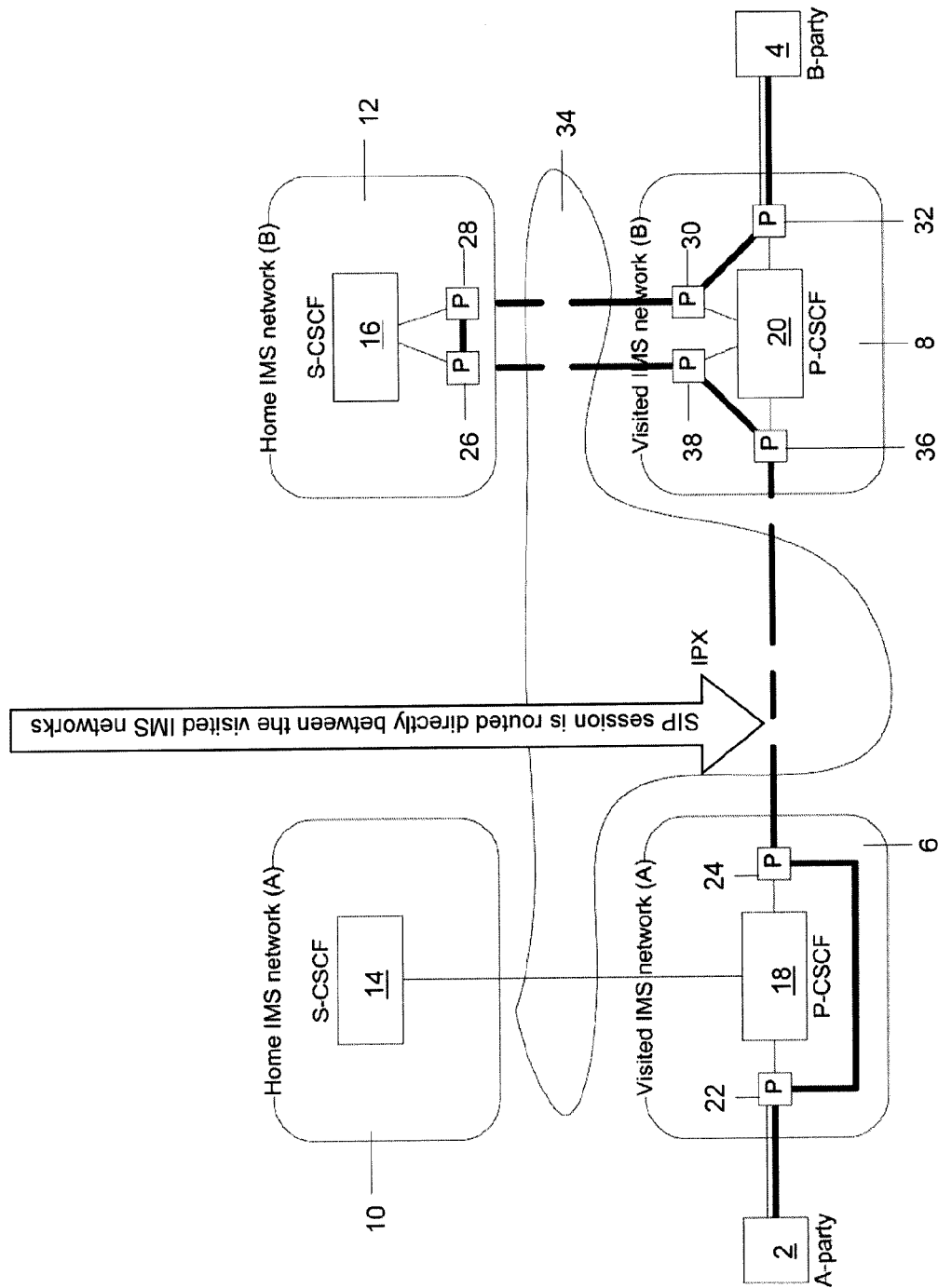
Figure 5C:
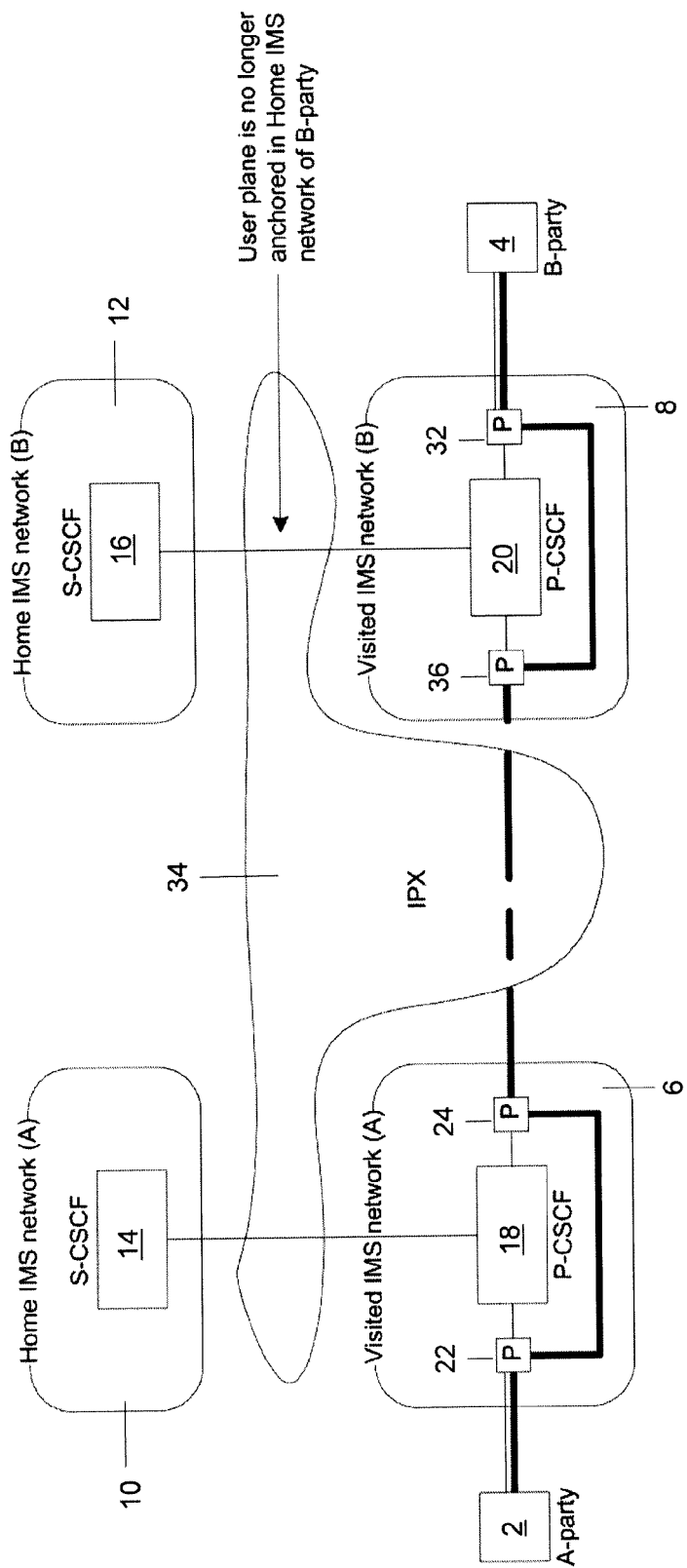

FIG. 5A-5C shows a two step approach for achieving the desired situation as described above. The method for arriving at scenario in FIG. 5C is explained by first sketching a more detailed SIP signaling flow when a call is established between two roaming VoLTE subscribers, without user plane optimization referring to FIG. 6.

Figure 6:
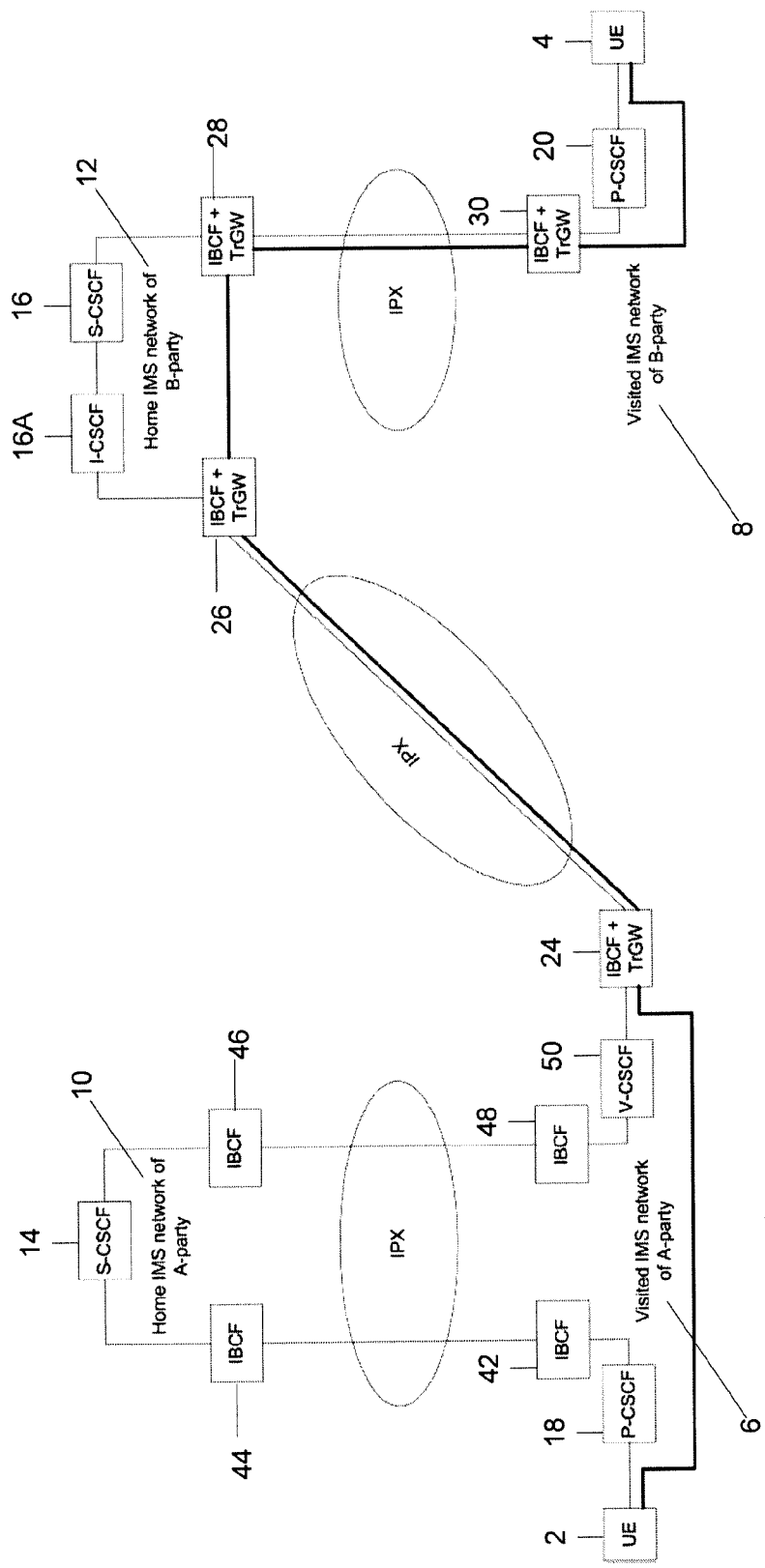
FIG. 6 is a schematic representation of a communications network.

FIG. 6 shows conceptual network architecture. Access networks of the VoLTE subscribers, for example, are not shown. It will be appreciated that in some embodiments the user equipment of the A-party and/or the B-party may make use of non-VoLTE access networks. Home Subscriber Server, HSS, interaction by an Interrogating Call Session Control Function, I-CSCF, 16A is not shown either. As described above, the different 'IPX clouds' can, in a deployment scenario, be one IPX network 34 or multiple IPX networks.

Figure 3:
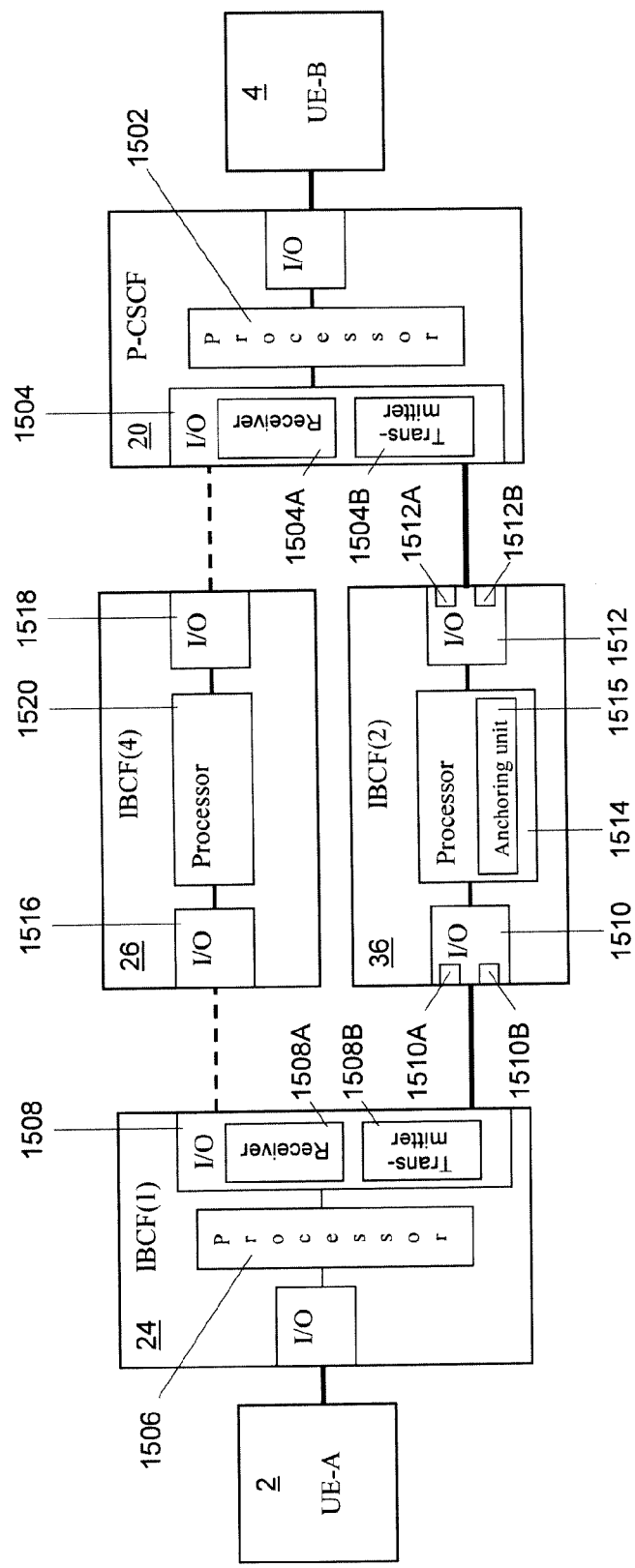
FIG. 3 is a schematic representation of a part of a communications network according to the invention.

The media path for the call is established through the Home IMS network 12 of the B-party and from there, the media path is routed to the Visited IMS network 8 of the B-party. SIP signaling that crosses a network boundary traverses an Interconnect Border Control Function, IBCF, 42, 44, 46, 48, 24, 26, 28, 30. Media that crosses a network boundary traverses a Transition Gateway, TrGW, 24, 26, 28, 30. The shown IBCFs (optionally including TrGWs) represent function components. FIG. 3 shows a schematic representation of a part of the communications network. The SIP signaling between the Visited IMS network 6 of the A-party 2 and the Home IMS network 10 of the A-party 2 can traverse the same IBCF 42/48, 44/46 in the respective IMS networks 6, 10.

The SIP session in FIG. 6 is the SIP session related to the first Invite transaction, for the case that the call is answered by the B-party 4 on his/her VoLTE terminal. The I-CSCF 16A will drop out of the SIP session after the first Invite transaction. Before the SIP session has become active, there may be announcement playing towards the calling party 2. Also, resource reservation (for the access network) may take place. Hence, one or more early dialogues may have been established towards the calling party 2. Finally, there will be a 200 Ok sent from the called party 4 towards the calling party 2.

The returning of the 200 Ok from called B-party 4 to calling A-party 2 has the effect that the SIP session as shown in FIG. 6 becomes the active SIP session. The media path was defined during the first Invite transaction. With the SIP session having become active, media will start flowing through the defined media path.

Figure 7:
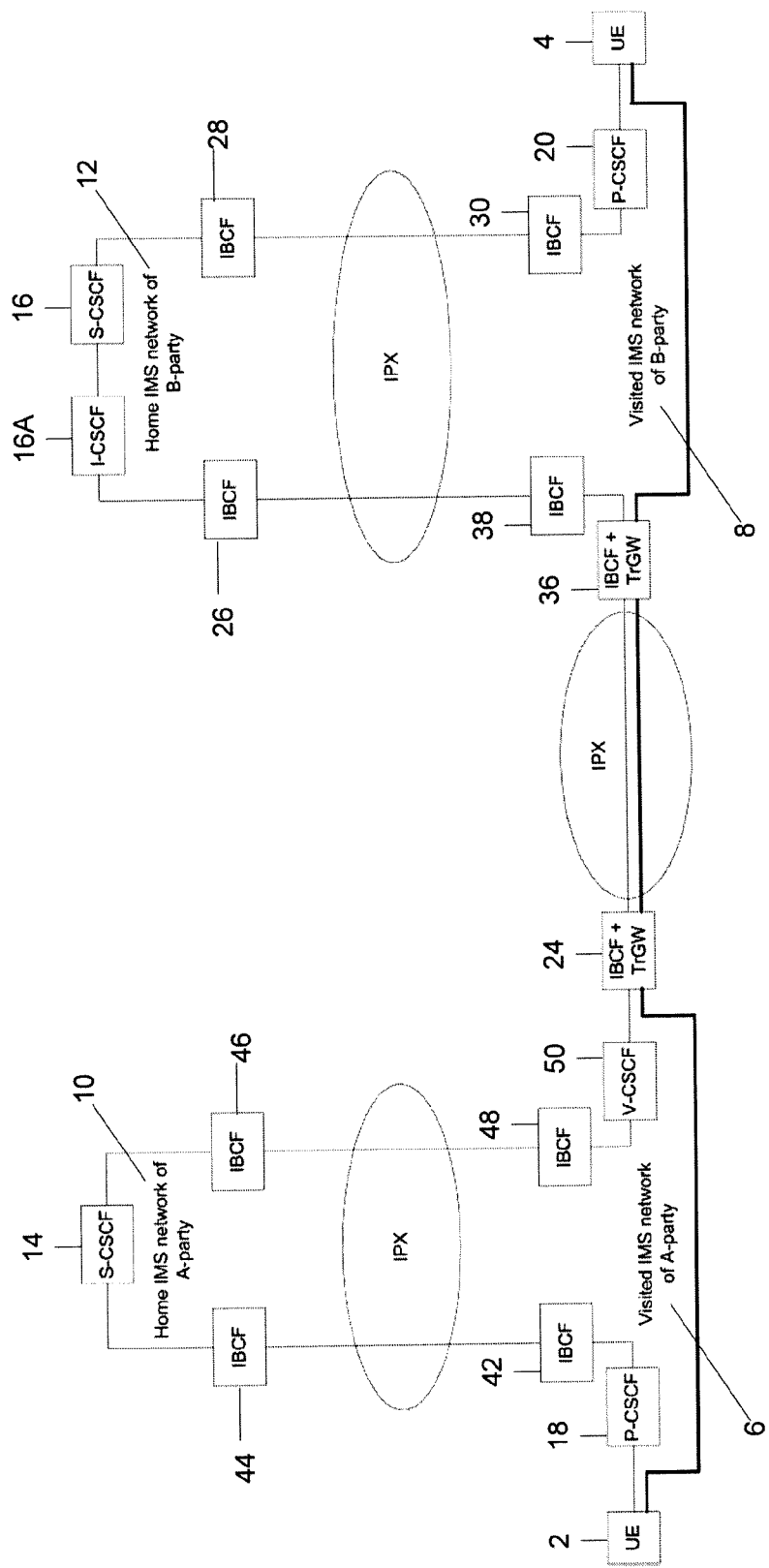
FIG. 7 is a schematic representation of a communications network.

Now that the call is answered, SIP signaling and the media path should follow the route as shown in FIG. 7. The network scenario depicted in FIG. 7 differs from the network scenario depicted in FIG. 6 as follows. The SIP session between the Visited IMS network 6 of A-party and the Home IMS network 12 of the B-party is routed via an additional IMS interconnect point in the Visited IMS network 8 of the B-party 4. This 'interconnect point' is formed by the IBCF/ TrGW combination 36 and the IBCF 38 in the Visited IMS network 8 of the B-party 4. The media is not anchored in the Home IMS network 12 of the B-party, i.e. the media is no longer traversing the B-party Home IMS network 12.

To achieve this situation, the network scenario of FIG. 6 is transformed into the network scenario of FIG. 7. Thereto the following steps are performed.

1. When the first Invite transaction between the A-party's UE 2 and the B-party's UE 4 (the UE on which the call is answered) is complete, a new SIP signaling path needs to be established. In this example two additional SIP proxies (two IBCFs 36, 38 in the Visited IMS network 8 of the B-party) are added to the SIP path. The effect of this step is that the SIP session between the A party 2 and the UE of the B-party 4 is established directly between the Visited IMS network 6 of the A-party and the Visited IMS network 8 of the B-party.

2. The IBCFs 26, 28 in the Home IMS network 12 of the B-party shall drop their anchoring of the media path. Hence, the media path is no longer required to traverse the B-party Home IMS network 12.

The above-described SIP signaling and media path optimization takes place once the call is established. Rationale is that only at call answer (by B-party) it is clear how the communication session will (need to) be established. As long as the call is not answered, it is still possible that the B-party answers the call on a non-SIP phone or that the call is forwarded to voicemail etc. In such cases, the call scenario will be different and the SIP signaling and media path optimization should not be applied.

When the SIP session between the A-party 2 and the B-party 4 is established end-to-end, Record-route headers have been exchanged between the respective end-points. It will be appreciated that some of the SIP proxies will act as Back-to-Back User Agent, B2BUA, so the exchange of Record-route headers is not entirely end-to-end. Instead, the exchange of Record-route headers will then be B2BUA to B2BUA.

Figure 8:
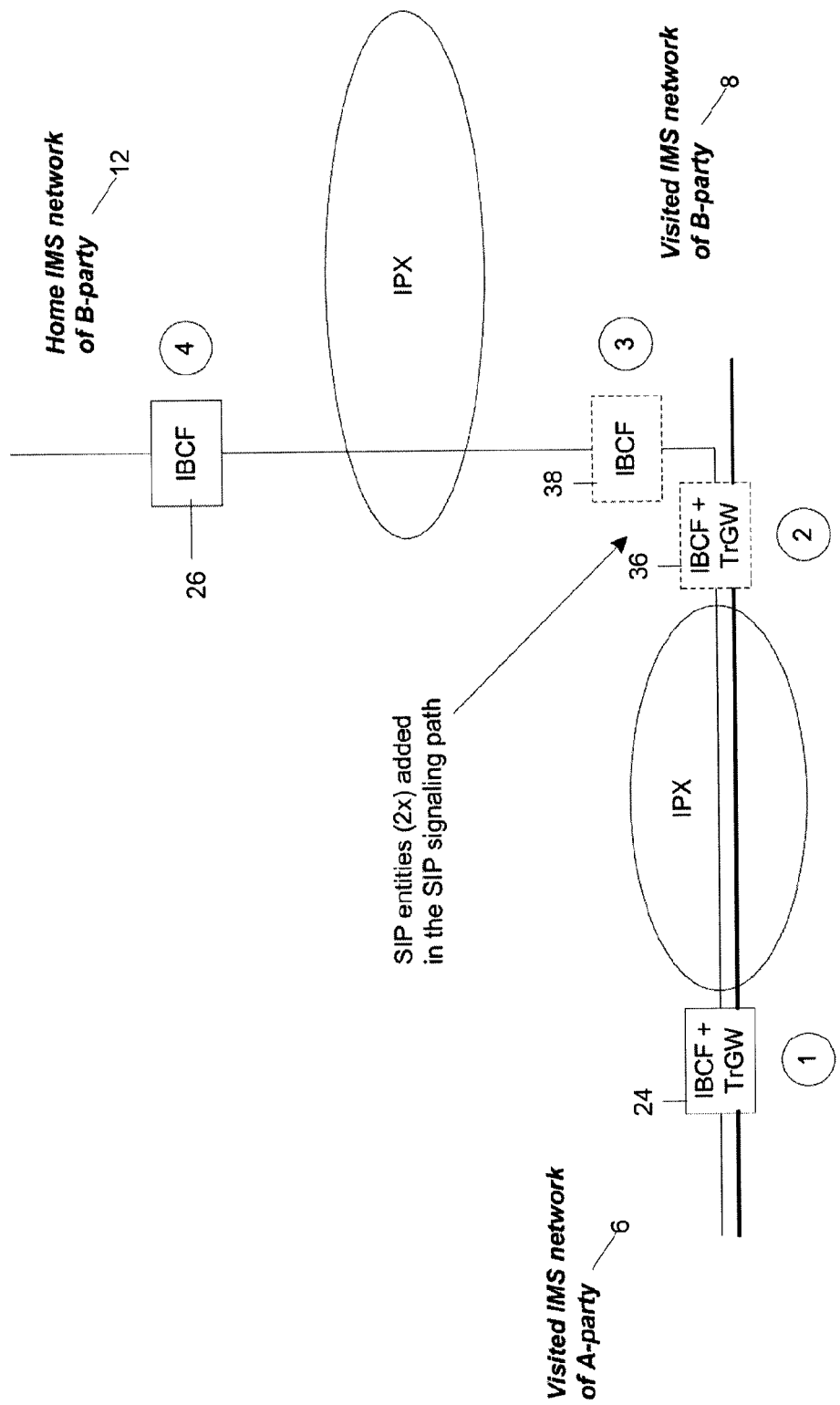
FIG. 8 is a schematic representation of a part of a communications network.
Figure 9:
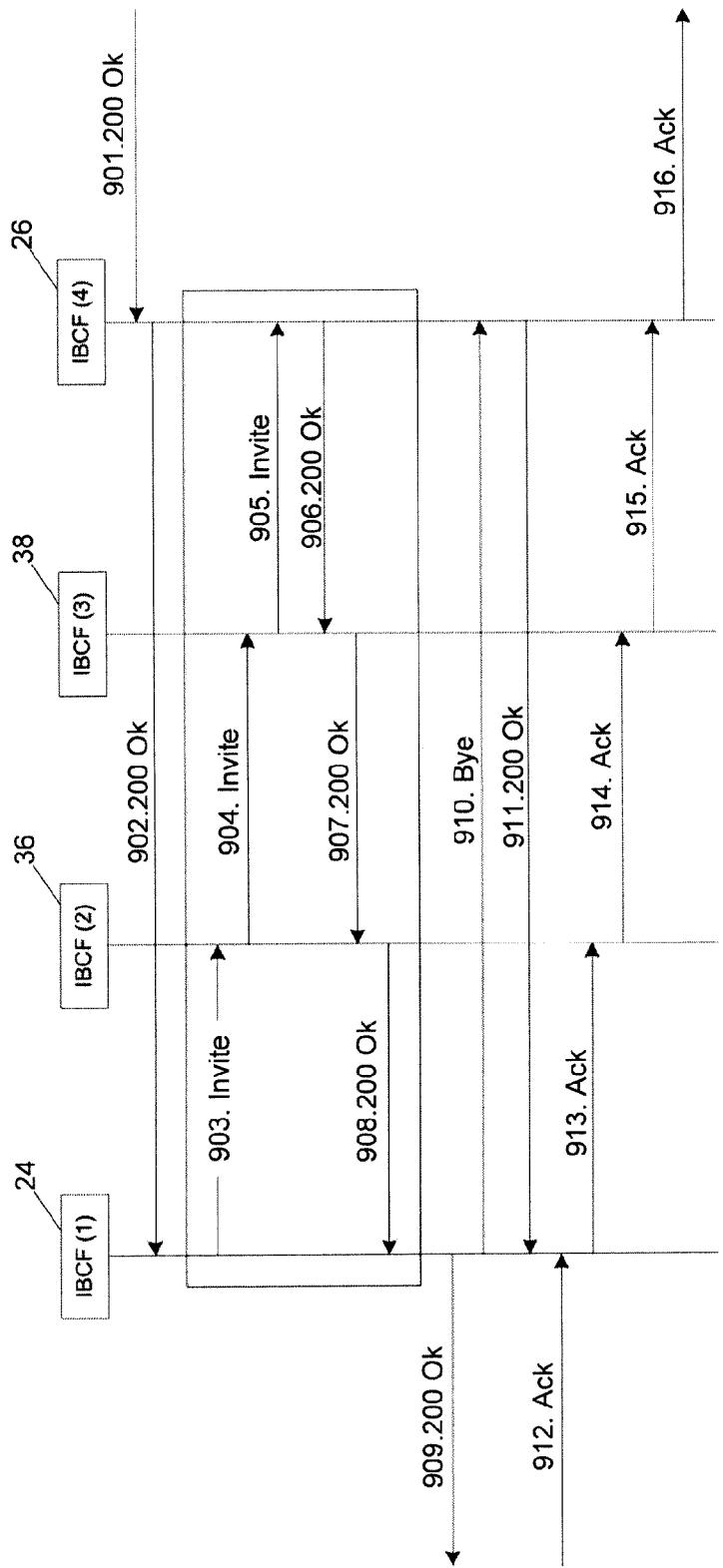
FIG. 9 is a schematic representation of a message flow in a part of a communications network.

FIG. 8 depicts the adding of the two SIP entities, IBCF 36 and IBCF 38, in the SIP signaling path. FIG. 8 shows only the two SIP entities 24, 26 immediately adjacent to the two new SIP entities 36, 38 for the SIP path. When the SIP session is established, i.e. when the 200 Ok is being routed towards the calling party 2, the SIP path is as depicted in FIG. 6. Now the section of the SIP path between IBCF 24 and IBCF 26 shall be replaced by a SIP path section between IBCF 24 and IBCF 26 traversing IBCF 36 and IBCF 38. FIG. 9 shows an example of how this is accomplished.

In step 901 a 200 Ok is received at IBCF 26 from the remote end (B-party's terminal) in response to the first Invite request from the IBCF 24 and the 200 Ok contains an indication that SIP session replacement shall be applied (see step 106 in FIG. 14). An example of such indication is Local_media_routing: True This indication also includes the IMS domain name ('realm') of the Visited IMS network 8 of the B-party 4. E.g.:

Local_media_routing: True;
realm=ims.mnc720.mcc302.3gppnetwork.org

This indication and this realm were included in the 200 Ok by the P-CSCF 20 of the B-party. Thereto the processor 1502 of the P-CSCF 20 is arranged for generating a first instruction to reroute the communication session via the IBCF 36 in the Visited IMS network 8 of the called subscriber. A transmitter 1504B of an Input/Output, I/O, unit 1504 of the P-CSCF 20 transmits this first instruction, e.g. as the indication in the 200 Ok, towards the Visited IMS network 6 of the A-party. The Session Description Protocol, SDP, Answer in the 200 Ok contains the IP address for the media stream, of the downstream media proxy.

SDP negotiation may have completed prior to 200 Ok. The SDP answer may, for example, have been transferred in a 183 Session progress. The SDP that was negotiated up to that stage shall be used in that case.

It is possible that multiple SDP answers have been returned towards the calling party. This can occur when multiple early SIP dialogues were established towards the calling party 2. When the 200 Ok is sent for the first Invite transaction, the 200 Ok relates to one of the dialogues that were established so far. The SDP of that dialogue shall be used. That SDP may be received in a 183 Session progress or in a 200 Ok for this dialogue.

When the first Invite does not contain an SDP offer, then the called party 4 provides an SDP offer in the 200 Ok or in the 183 Session progress. Also in such case the SDP as applicable at the time of 200 OK from called party shall be used.

In step 902 the 200 Ok is forwarded upstream as normal, based on the Via header that was stored by the IBCF 26 for this first Invite transaction. The indication that SIP session replacement shall be applied is retained in the 200 Ok. The SDP Answer in the 200 Ok contains the IP address for the media stream, of the downstream media proxy. The IBCF 26 acts as transparent B2BUA and anchors the media stream in an associated TrGW.

In step 903 the IBCF 24 supports SIP session replacement, so it will, upon request, apply the SIP session section replacement. Hereto, it sends a second Invite request to the remote Contact address as applicable for this SIP session. Thereto, a processor 1506 of the IBCF 24 is arranged for generating the second Invite request to be sent towards the IBCF 26. An I/O unit of the IBCF 24 includes a transmitter 1508B for transmitting the second Invite. For the IBCF 24, the remote Contact address is the address of the IBCF 26 (see step 108 in FIG. 14). The IBCF 24 includes a Route header in the Invite, being the IMS domain of the Visited IMS network 8 of the B-party 4. The IBCF 24 also includes a Dialogue-replaces header in the second Invite request. This SIP header indicates to the recipient of this second Invite request that this second Invite request replaces another, existing dialogue, namely the dialogue indicated in the Dialogue-replaces header. The second Invite will be dispatched towards the Visited IMS network 8 of the B-party 4 (indicated in the Route header) (see step 110 in FIG. 14). The IBCF 36 represents an incoming IBCF for the Visited IMS network 8 of the B-party 4.

The SDP offer in the second Invite is equal to the SDP offer that was initially offered from IBCF 24 to IBCF 26 in the first Invite.

In this example, IPX 34 does not modify the SDP that has been negotiated between the calling A-party 2 and called B-party 4, apart from potentially anchoring media through a user plane proxy (Transition Gateway, TrGW). For the re-establishment of the SIP session between the IBCF 24 and the IBCF 36, there will be IPX 34 between the IBCF 24 and the IBCF 36 as well as IPX 34 between the IBCF 38 and the IBCF 26. Media anchoring by these IPX's is transparent for the respective IBCF's. It is already noted here that media anchoring between the IBCF 38 and the IBCF 26 will be undone in a next step, as part of the media routing optimization procedure as a whole.

In step 904 The IBCF 36 forwards, by means of I/O units 1510, 1512 (and the included receivers 1510A, 1512A and transmitters 1510B, 1512B), the second Invite request towards its destination, namely the IBCF 26, as indicated in the Request URI. The second Invite will be routed via an outgoing IBCF for the Visited IMS network 8 of the B-party, viz. the IBCF 38. The IBCF 36 and the IBCF 38 can, in a practical deployment, be the same IBCF. The IBCF 36 acts as a transparent B2BUA and anchors the user plane in a TrGW. This is reflected in the SDP offer sent from the IBCF 36 to the IBCF 38.

In step 905 the second Invite request is forwarded to the IBCF 26, as indicated in the Request URI. The Dialogue-replaces header in the second Invite request tells the IBCF 26 that this Invite request replaces the dialogue that was established between the IBCF 24 and the IBCF 26. The IBCF 26 is acting as a B2BUA, so it may support this capability. The IBCF 38 acts as transparent B2BUA and anchors the user plane in a TrGW. This is reflected in the SDP offer sent from the IBCF 38 to the IBCF 26.

In steps 906-908 a 200 Ok is returned, in response to the second Invite request, from the IBCF 26 to the IBCF 24, traversing the IBCF 38 and the IBCF 36, based on the Via headers, as normal. As a result of the second Invite request (steps 903, 904, 905) and the related 200 OK (steps 906, 907, 908), the IBCF 24 and the IBCF 26 have established a SIP session section, traversing the IBCF 36 and the IBCF 38. It is understood that the IBCF 36 and the IBCF 38 act as transparent B2BUA, since they reside at a network boundary.

The SDP answer in the 200 Ok of step 906 is equal to the SDP answer that was provided from the IBCF 26 to the IBCF 24, in step 902. The IBCF 36 and the IBCF 38 anchor the media in a respective TrGW, which is reflected in 200 Ok of step 907 and 200 Ok of step 908 (see step 112 in FIG. 14). Thereto, a processor 1514 of the IBCF 36 includes an anchoring unit 1515 arranged for anchoring the media. The anchoring unit 1515 is arranged for inserting the TrGW in the part of the media path of the communication session extending from the first Visited IMS network (6) to the A-party Home IMS network (12).

Resulting from the 200 Ok of steps 906, 907 and 908, the IBCF 24 and the IBCF 26 also update their associated TrGw, as follows. The IBCF 24 updates its TrGW for a user plane connection with the TrGW controlled by the IBCF 36. The IBCF 26 updates its TrGW for a user plane connection with the TrGW controlled by the IBCF 38. The SIP messages of steps 903-908 relate to the establishment of the 'replacement SIP session section'.

In step 909 the IBCF 24 sends a 200 Ok upstream. This 200 Ok relates to the first Invite request earlier received from upstream.

In steps 910 and 911 the SIP session section between the IBCF 24 and the IBCF 26 is released. It has been replaced by a SIP session section between the IBCF 24 and the IBCF 26, traversing the IBCF 36 and the IBCF 38 (see step 114 in FIG. 14).

In step 912 an Ack is received from the calling party 2, as normal.

In steps 913-915 the Ack are the Ack for the SIP session section that was established between the IBCF 24 and the IBCF 26, traversing the IBCF 36 and the IBCF 38.

In step 914 the Ack that is generated by the IBCF 36 contains an indication that media path optimization shall be applied (see step 116 in FIG. 14). Thereto, the processor 1514 of the IBCF 36 is arranged for generating this indication and inserting the indication into the Ack. The Ack containing the indication is transmitted by the transmitter 1512B of the IBCF 36. This indication may have the following form:

Local_media_routing: True

This SIP header is conveyed further downstream, towards the called party 4. It will be by the receiver 1504A of the P-CSCF 20 of the called party, and used as a next step, to optimize the user plane for this call.

In step 916 the Ack is sent downstream towards the called B-party 4.

Figure 10:
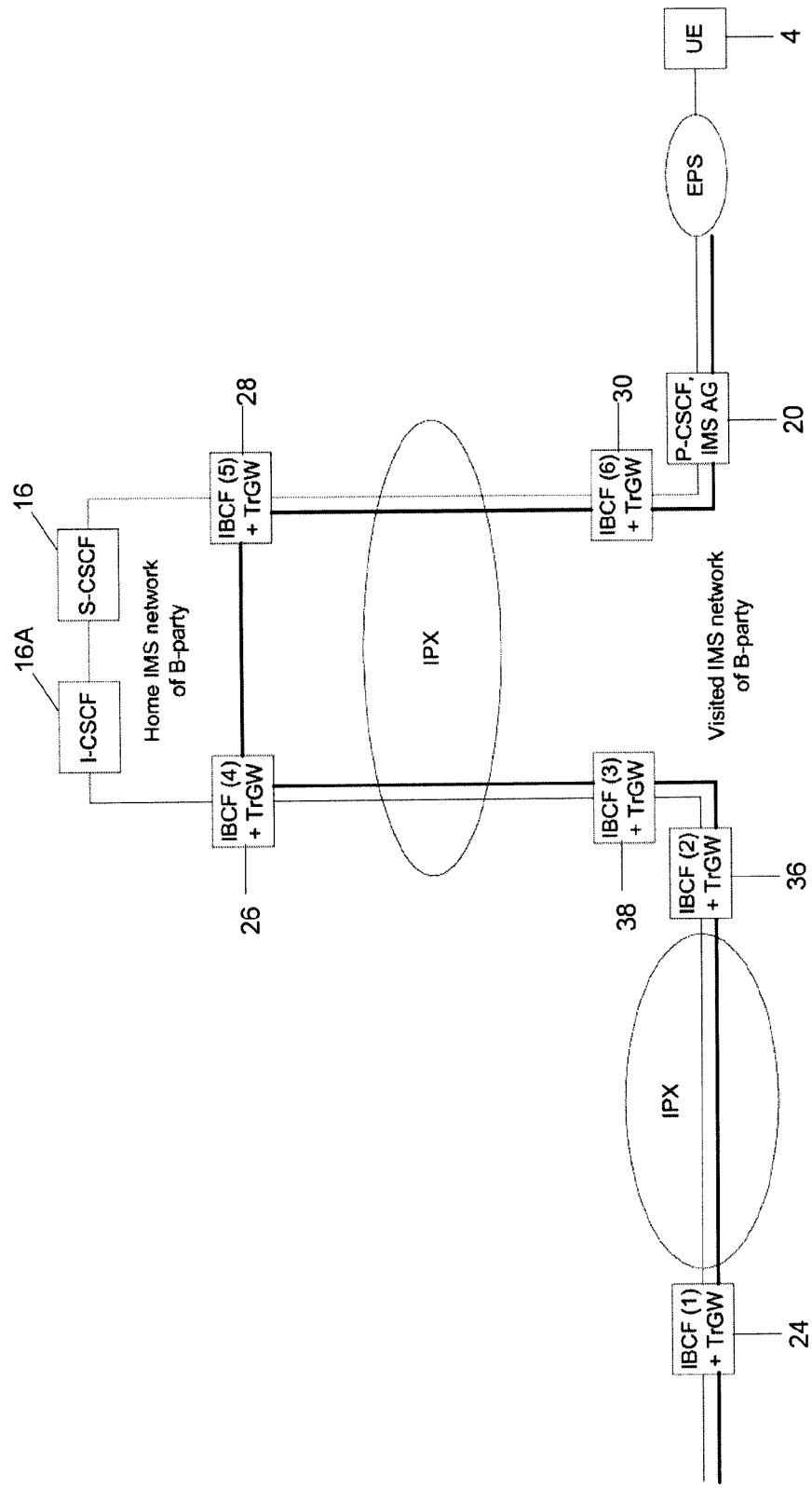
FIG. 10 is a schematic representation of a part of a communications network.

The replacement of the SIP session section between the IBCF 24 and IBCF 26 (see FIG. 6) by the SIP session section between the IBCF 24 and the IBCF 26, traversing the IBCF 36 and the IBCF 38, leads to the SIP session scenario as depicted in FIG. 10.

The SIP session and media routing after SIP session section replacement, as depicted in FIG. 10 does not constitute the desired end situation. A next step is the optimization of the media path between the Home IMS network 12 of the B-party 4 and the Visited IMS network 8 of the B-party.

Figure 11:
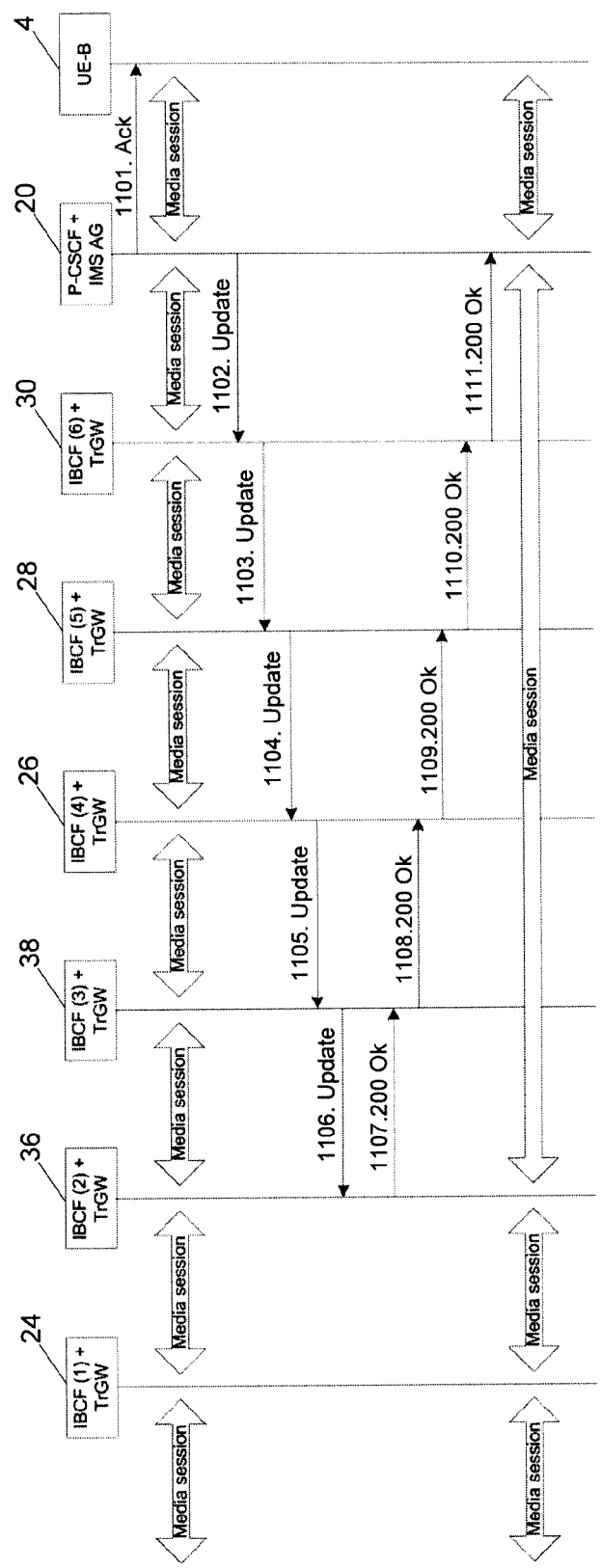
FIG. 11 is a schematic representation of a message flow in a part of a communications network.

The removing of the media anchoring between the Home IMS network 12 of the B-party and the Visited IMS network 8 of the B-party is explained through reference to FIG. 11.

The SIP sequence diagram starts with the Ack sent from the P-CSCF 20 of the B-party to the UE-B 4. The Ack from calling party's UE 2 up to the P-CSCF 20 of the B-party is not shown.

The updating of the media plane, to remove media anchoring between the Visited IMS network 8 of called party and the Home IMS network 12 of the called party, is optimization for the terminating call half. It involves signalling between the Visited IMS network 8 of called party and the Home IMS network 12 of the called party. More specifically, it involves signalling and media path update between the IBCF 36, the IBCF 38, the IBCF 26, the IBCF 28, the IBCF 30 and the P-CSCF 20, and their respective TrGW c.q. IMS Access Gateway, AG. The Visited IMS network 6 of the calling party as well as the Home IMS network 10 of calling party are not affected by this media optimization for the called party.

In step 1101 the P-CSCF 20 has forwarded the Ack towards the UE 4.

In step 1102 the P-CSCF 20 initiates the media path update. This media path update relates to the media path between the TrGW(2) controlled by the IBCF 36 and the IMS AG controlled by the P-CSCF) 20. The P-CSCF 20 is suitably adapted hereto to initiate and apply this media path update. The processor 1502 of the P-CSCF 20 is arranged for generating a second instruction for the Home IMS network 12 of the called subscriber to release anchoring of the media path so that the media no longer traverses the Home IMS network. Thereto, the processor 1502 of the P-CSCF 20 generates an indication that local media routing shall apply and includes this indication in an Update request. The transmitter 1504B of the P-CSCF 20 sends the Update towards the calling party. The P-CSCF 20 is acting as transparent B2BUA, so it has this capability. This indication has the form of a designated option tag in the Require header:

Require: Local_media_routing

The Update is sent in accordance with regular SIP routing (using Record-route headers and Contact header in force for this SIP session), meaning that it is sent towards the IBCF 30, since that was the previous SIP Entity in the SIP chain. The Update contains an SDP offer that is equal to the SDP that was agreed during the Invite transaction (the version of the SDP is stepped, as required).

In steps 1102-1106 the Update request traverses the IBCF 30, the IBCF 28, the IBCF 26 and the IBCF 38, before arriving at the IBCF 36. Each hop is traversed in accordance with regular SIP routing. The respective IBCFs act as B2BUA. The Require: Local_media_routing header informs the IBCFs 30, 28, 26 and 38 that media optimization is required and authorized. Hence, these IBCFs shall no longer anchor the user plane for this SIP session in an associated TrGW. So, the TrGW resources (media connection) that were allocated by the respective IBCF are released (see step 118 in FIG. 14). Thereto for instance a processor 1520 of the IBCF 26 is arranged to release media anchoring, i.e to remove the IBCF 26 from the media path. The SDP offer of the Update request is passed on unmodified.

In step 1106 the Update request arrives at the IBCF 36. The IBCF 36 is the SIP entity that had indicated that it can apply the media optimization. This implies that the IBCF 36 will act as the eventual destination of the Update request. The IBCF 36 has already allocated a TrGW for the user plane. It will keep the TrGW allocated, but will update the user plane; it uses the SDP offer received in the Update request, to establish a user plane between the IMS AG and this TrGW controlled by the IBCF 36. Thereto, the processor 1514 of the IBCF 36 is arranged accordingly.

In steps 1107-1111 the IBCF 36 returns a 200 Ok, containing the SDP answer (see step 120 in FIG. 14). The SDP answer is received by the P-CSCF 20 and is used to update the user plane for the IMS AG. The arriving of the 200 Ok at the P-CSCF 20 completes the Update transaction.

Figure 12:
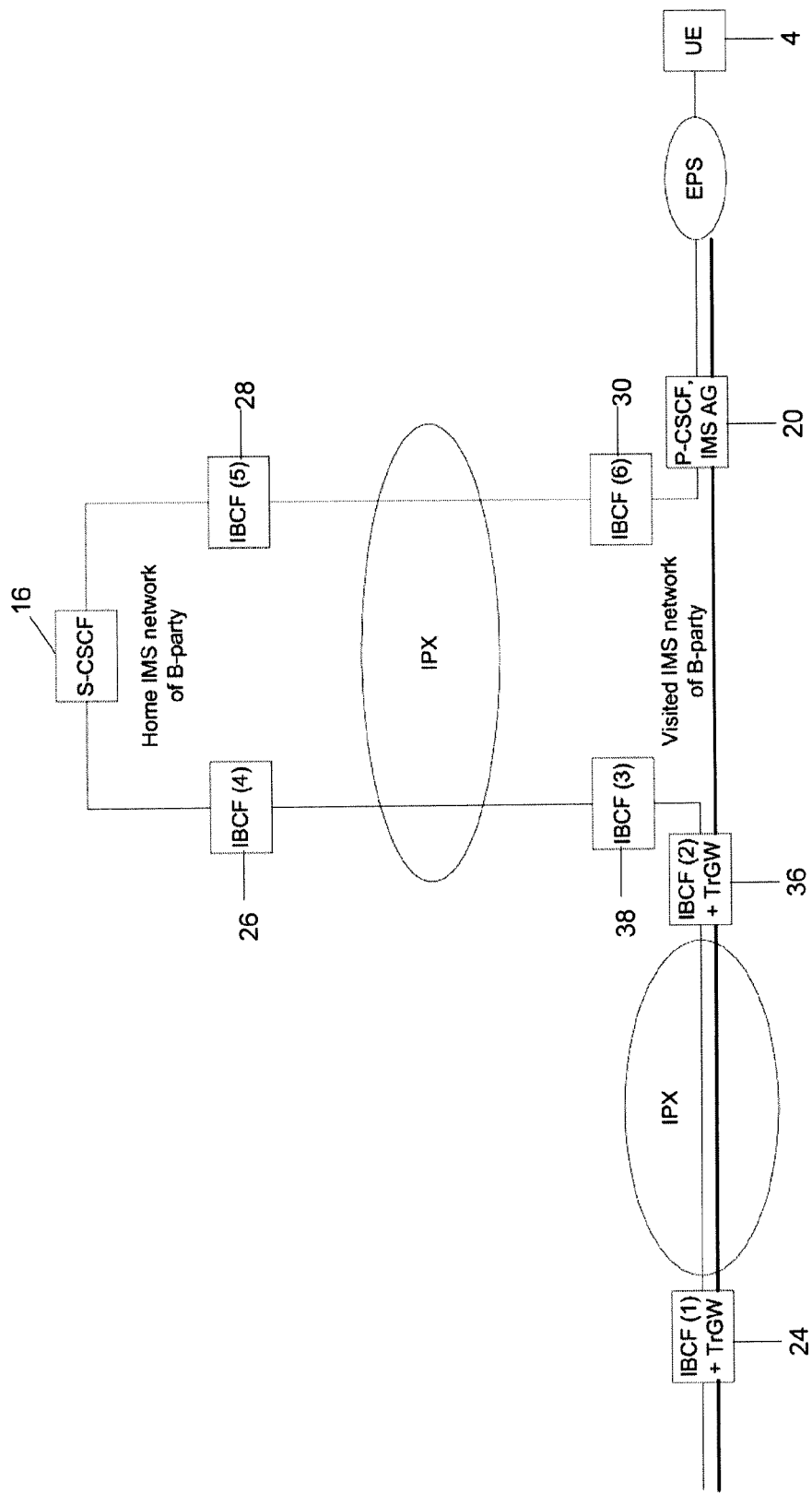
FIG. 12 is a schematic representation of a part of a communications network.

When the Update transaction is complete, the following desired call situation has been achieved. The SIP signalling and user plane for the call between the calling party and the called party are routed directly from the Visited IMS network 6 of the calling party to the Visited network 8 of the called party. The control plane is routed between the Visited IMS network 8 of called party and the Home IMS network 12 of the called party. The user plane is kept in the Visited IMS network of the called party, i.e. the user plane is routed directly between the Visited IMS network 6 of the calling party and the Visited network 8 of the called party. This situation is depicted in FIG. 12.

It will be appreciated that 3GPP TS 23.228 IP Multimedia Subsystem (IMS); Stage 2, section Q, 'Optimal media routing' (OMR), specifies how a user plane entity may be removed from an established SIP session. The present invention goes beyond OMR and uses the concept for optimizing the media transfer of VoLTE calls when the called subscriber is roaming. It is emphasized, however, that applying OMR for these calls would not be sufficient to achieve the desired optimization. One aspect of the present invention is that first the SIP session, for the call as answered, is moved such that it is routed directly from the Visited IMS network 6 of the calling party to the Visited IMS network 8 of the called party. Once the SIP session has been re-routed as described above, media path optimization is applied, for no longer routing the media between the Visited IMS network of the calling party and the Home IMS network of the called party.

As described above, the optimization of the user plane is applied through signaling between the Visited IMS network 8 of the called party and the Home IMS network 12 of the called party. This user plane optimization is done through signaling between the P-CSCF 20 of the called party and the IBCF 36. The Update transaction between the P-CSCF 20 and the IBCF 36 is user hereto. Rationale is that the user plane optimization is in any case restricted to this part of the SIP session.

Instead of applying signaling between the P-CSCF 20 and the IBCF 36 after the Ack has been forwarded to the called party's UE 4, the signaling between the P-CSCF 20 and the IBCF 36 may be done prior to forwarding the Ack towards the called party's UE 4. An advantage is that when the UE 4 receives the Ack, the user plane optimization has taken place and there will not be further changes to the user plane.

The user plane optimization requires capability negotiation between the involved entities. For the establishment of the replacement SIP session section between the IBCF 24 in the Visited IMS network 6 of calling party and the IBCF 26 in the Home IMS network 12 of the called party, there needs to be negotiation between the IBCF 24 and the IBCF 26. The IBCF 24 indicates in the (first) Invite request that it supports optimized media routing (see step 102 in FIG. 14), e.g.:

Supported: Optimized_media_routing

The IBCF 26 can then decide whether to instruct the IBCF 24 to apply optimized media routing, as described. For the user plane optimization, between the Visited IMS network 8 of the called party and the Home IMS network 12 of called party, capability negotiation is needed between the IBCF 36 and the P-CSCF 20. This is done through a designated indication in the Ack:

Supported: Local_media_routing

The P-CSCF 20 can then, when it detects that Local_media_routing is supported for this SIP session, initiate the local media routing as described. The Update request from the P-CSCF 20 contains the header:

Require: Local_media_routing

When the user plane is established from the Visited IMS network 6 of the calling party directly to the Visited IMS network 8 of the called party, this may lead to cost saving for the calling party. The 200 Ok response from the IBCF 24, towards the calling party, thereto contains adequate indication that the SIP session is established in optimized manner, i.e. directly to the Visited IMS network 8 of the called party, as described. This indication traverses the various SIP entities, such as the S-CSCF 14 of the calling party and the MMTel application server of the calling party. This is then used for adapting the cost of the SIP session.

Likewise, the SIP signaling for the called party, between the Visited IMS network 8 of the called party and the Home IMS network 12 of the called party, carries an indication that the user plane is optimized, i.e. routed locally in the Visited IMS network 8 of the called party. This may lead to cost saving of called party. Cost saving for the called party may, for example, apply when the call is established to the called party who is roaming abroad, by a calling party residing in that same (foreign) country.

It is further understood that the Visited IMS network 6 of calling party may apply the optimized SIP session routing selectively. The 200 Ok received by the IBCF 24 from the IBCF 26 contains an indication that optimized SIP session routing can be applied. The IBCF 24 then determines whether applying optimized SIP session routing would lead to cost saving for the calling party. Specifically, whether the user plane from the IBCF 24 and the associated TrGW to the IBCF 36 and the associated TrGW would carry a lower cost than the user plane from the IBCF 24 and the associated TrGW to the IBCF 26 and the associated TrGW.

When a SIP session is established between the UE of the A-party 2 and the UE of the B-party 4, said SIP session comprising both control plane and user plane, there may be a requirement for the playing of announcements. Such requirement may exist e.g. in the MMTel service logic processing for the A-party or B-party.

Figure 13:
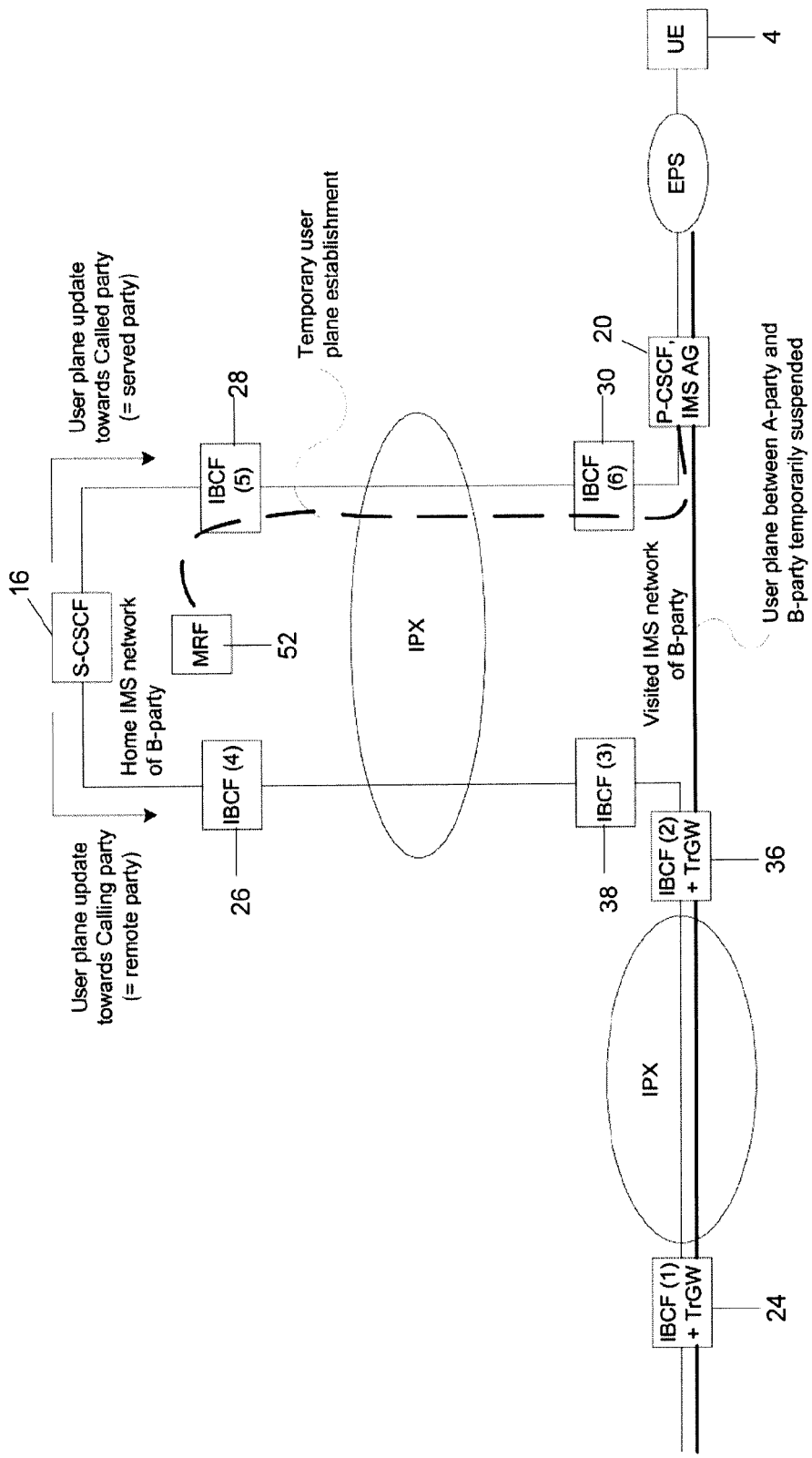
FIG. 13 is a schematic representation of a part of a communications network.

Within the architecture proposed by RAVEL, an MMTel service controlling the call of the A-party may apply SDP update to establish a user plane connection between the UE of the A-party 2, in the Visited IMS network 6, and a Media Resource Function Server, MRF, 52 in the Home IMS network 10. The user plane with the remote party is placed on hold whilst user interaction with the served party is ongoing. This method of temporarily 'pulling the user plane through the home IMS network' may also be applied for the B-party. This is reflected in FIG. 13.

The proposed method of optimized media transfer for VoLTE calls should be usable also for calls that are subject to Single radio Voice call continuity, SR-VCC, between LTE access and Universal Terrestrial Radio Access Network, UTRAN, access, in either direction. Thereto, the following requirements apply. Media anchoring for the called party is done in the Enhanced packet system, EPS, of the visited network 8. Specifically, the voice and/or video call is established through the Access transfer control function, ATCF, as specified for SR-VCC in 3GPP Rel-10. The MSC in the visited network, providing UTRAN access capability, supports the I2 reference point, as specified in 3GPP for IMS centralized services. Herein MSC is an enhanced MSC, eMSC. Establishing a terminating access call towards the called subscriber's mobile phone through CS access by the Terminating access domain selection, T-ADS, procedure in SCC-AS, takes place by T-ADS obtaining a Mobile station routing number, MSRN, from the Home Subscriber Server/Home Location Register, HSS/HLR, facilitating SIP session establishment from a CSCF in the Home IMS network to the eMSC in the Visited IMS network, without having to use GMSC functionality. A terminating access call towards the called subscriber's mobile phone through CS access is done through the ATCF. Hence, the ATCF is used as Path header for the SIP session towards the eMSC serving the called subscriber. Routing the SIP session towards the eMSC through the ATCF is needed for reverse SR-VCC (rSR-VCC), from UTRAN access to LTE access.

In the foregoing, the invention has been described with reference to specific examples of embodiments of the invention. It will, however, be evident that various modifications and changes may be made therein, without departing from the essence of the invention.

The invention provides the advantage that cost saving can be achieved for VoLTE calls between roaming VoLTE subscribers, or when the called party is roaming. In addition, the advantage is obtained that media will be routed through fewer media proxies, generally resulting in improved media quality. This may be especially relevant for video calls (Video over LTE). Another advantage is that the optimised media routing reduces network load.

For voice/video calls between roaming VoLTE subscribers, the SIP session, including the user plane, is carried directly between the Visited IMS network of the calling party and the Visited IMS network of the called party. This allows for optimized user plane routing between the Visited IMS network of the calling party and the Visited IMS network of the called party. The control plane for the call is still routed through the Home IMS network of the called party. FIG. 7 depicts the routing of the control plane and user plane for this call case.

In one use case the media optimization will be applied only for those call cases where it is determined that it is feasible (supported by the involved entities) and leads to cost saving.

It will be appreciated that the processors, 1502, 1506, 1514, 1520, I/O units 1504, 1508, 1510, 1512, 1516, 1518 and/or the anchoring unit 1515 can be embodied as dedicated electronic circuits, possibly including software code portions. The processors, 1502, 1506, 1514, 1520, I/O units 1504, 1508, 1510, 1512, 1516, 1518 and/or the anchoring unit 1515 can also be embodied as software code portions executed on, and e.g. stored in a memory of, a programmable apparatus such as a computer.

However, other modifications, variations, and alternatives are also possible. The specifications, drawings and examples are, accordingly, to be regarded in an illustrative sense rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for establishing a communication session in a communications network, between a calling subscriber user equipment residing in a first Visited Internet Protocol Multimedia Subsystem, IMS, network and a called subscriber user equipment roaming in a second Visited IMS network, said method including:
    routing a first Invite request for the communication session via a media path extending from the first Visited IMS network via a Home IMS network of the called subscriber to the second Visited IMS network, wherein the first Invite request has a control path for the communication session extending from the first Visited IMS network via the Home IMS network of the called subscriber to the second Visited IMS network;
    establishing the communication session by the called subscriber user equipment and next;
    inserting an additional IMS network entity, residing in the second Visited IMS network, in the part of the media path of the communication session extending from the first Visited IMS network to the Home IMS network of the called subscriber, and inserting an additional IMS network entity, residing in the second Visited IMS network, in the part of the control path of the communication session extending from the first Visited IMS network to the Home IMS network of the called subscriber; and
    removing the Home IMS network of the called subscriber from the media path of the communication session.

2. The method according to claim 1, wherein the communication network is a Voice over Long Term Evolution, VoLTE, based communications network.

3. The method according to claim 1, wherein upon inserting the additional IMS network entity a signalling path is established from the additional IMS network entity via the Home IMS network of the called subscriber to the called subscriber user equipment.

4. The method according to claim 1, wherein the first Invite request includes an indication that inserting of the additional IMS network entity is supported by the calling subscriber and/or supported by the first Visited IMS network.

5. The method according to claim 1, wherein the step of inserting the additional IMS network entity includes:
    providing to an IMS proxy of the first Visited IMS network an indication that the additional IMS network entity is to be inserted in the media path, wherein the indication comprises a domain name of the additional IMS network entity of the second Visited IMS network;
    transmitting, by the IMS proxy of the first Visited IMS network, a second Invite request to the additional IMS network entity; and forwarding by the additional IMS network entity the second Invite request to the Home IMS network of the called party, whereby the second Invite request is forwarded through the additional IMS network entity.

6. The method according to claim 5, wherein the additional IMS network entity anchors the media path.

7. The method according to claim 5, including prior to removing the Home IMS network of the called subscriber from the media path:
including in the second Invite request an instruction to the Home IMS network of the called party that said Invite request replaces the previous dialogue that was established between the IMS proxy of the first Visited IMS network and the Home IMS network of the called subscriber.

8. The method according to claim 1, wherein the step of removing the Home IMS network of the called subscriber from the media path includes:
transmitting by the Proxy call session control function, P-CSCF, of the called subscriber to the additional IMS network entity an Update request including an indication that each network entity, associated with each hop between the P-CSCF and the additional IMS network entity, is to be removed from the media path.

9. The method according to claim 1, wherein the additional IMS network entity includes a first interconnect border control function IBCF and a second IBCF, wherein after the step of removing the Home IMS network of the called subscriber from the media path the first IBCF has a transition gateway, TrGW, associated therewith for handling the user plane communication with the first Visited IMS network, wherein the first IBCF handles the control plane communication with the first Visited IMS network, and wherein the second IBCF handles the control plane communication with the Home IMS network of the called subscriber.

10. The method according to claim 1, further including:
performing a communication session wherein,
a control plane of the communication session is routed between the first Visited IMS network and the Home IMS network of the calling subscriber;
the control plane and user plane are routed directly between the first Visited IMS network and the second Visited IMS network; and
the control plane is routed between the second Visited IMS network and a Home IMS network of the called subscriber.

11. A communications network, including a calling subscriber user equipment residing in a first Visited Internet Protocol Multimedia Subsystem, IMS, network; and
a called subscriber user equipment roaming in a second Visited IMS network and having associated therewith a Home IMS network of the called subscriber,
wherein the first Visited IMS network is arranged for routing a first Invite request having a media path for the communication session from the first Visited IMS network via the Home IMS network of the called subscriber to the second Visited IMS network;
wherein the first Visited IMS network is arranged for routing the first Invite request having a control path for the communication session from the first Visited IMS network via the Home IMS network of the called subscriber to the second Visited IMS network;
wherein the called subscriber user equipment is arranged for establishing the communication session;
wherein the second Visited IMS network is arranged for next inserting an additional IMS network entity in the part of the media path of the communication session from the first Visited IMS network to the Home IMS network of the called subscriber;
wherein the second Visited IMS network is arranged for next inserting an additional IMS network entity in the part of the control path of the communication session from the first Visited IMS network to the Home IMS network of the called subscriber; and
wherein the Home IMS network of the called subscriber is arranged for removing the Home IMS network of the called subscriber from the media path.

12. The communications network according to claim 11, wherein
the control plane is routed between the first Visited IMS network and the Home IMS network of the calling subscriber;
the control plane and user plane are routed directly between the first Visited IMS network and the second Visited IMS network; and
the control plane is routed between the second Visited IMS network and the Home IMS network of the called subscriber.

13. An Internet Protocol Multimedia Subsystem, IMS, proxy entity for use in a Visited IMS network for an IMS subscriber user equipment,
the IMS proxy entity including an anchoring unit arranged for inserting the IMS proxy entity in the media routing of an existing IMS communication session with the IMS subscriber user equipment, wherein the IMS proxy entity is further arranged for inserting the IMS proxy entity in the control routing of the existing IMS communication session with the IMS subscriber user equipment,
the IMS proxy entity further including a processing unit arranged for generating an indication to be sent towards a Home IMS network associated with the IMS subscriber user equipment of the called subscriber that the IMS proxy entity is capable of routing the user plane to the IMS subscriber user equipment without traversing the Home IMS network of the called subscriber, and a transmitter for transmitting the indication towards the Home IMS network associated with the IMS subscriber user equipment of the called subscriber.

14. A Proxy Call Session Control Function, P-CSCF entity, associated with a called subscriber residing in a Visited IMS network, including:
a receiver arranged for receiving an Invite request for establishing a communication session from an IMS network associated with a calling subscriber including an indication that optimization of a media path of the communication session is supported,
a processing unit arranged for generating a first instruction to reroute the communication session via an additional network entity in the Visited IMS network of the called subscriber, the additional network entity anchoring the media path and the control path,
a transmitter arranged for transmitting the instruction towards the IMS network associated with the calling subscriber,
the receiver further being arranged for receiving an indication that the additional network entity of the Visited IMS network of the called subscriber is capable of forwarding media to the P-CSCF without traversing a Home IMS network of the called subscriber, and
the processing unit further being arranged for generating a second instruction for the Home IMS network of the called subscriber to release anchoring of the media path so that the media does not traverse the Home IMS network, the transmitter further being arranged for transmitting the second instruction to the Home IMS network of the called subscriber, said instruction being forwarded to the additional IMS network entity.

\* \* \* \* \*